(12) United States Patent
Futa et al.

(10) Patent No.: US 7,792,286 B2
(45) Date of Patent: Sep. 7, 2010

(54) SIGNATURE GENERATION DEVICE AND SIGNATURE VERIFICATION DEVICE

(75) Inventors: Yuichi Futa, Osaka (JP); Shingo Hasegawa, Miyagi (JP); Shuji Isobe, Miyagi (JP); Motoji Ohmori, Osaka (JP); Hiroki Shizuya, Miyagi (JP)

(73) Assignee: Panasonic Corporation, Osaka (JP)

( * ) Notice: Subject to any disclaimer, the term of this patent is extended or adjusted under 35 U.S.C. 154(b) by 884 days.

(21) Appl. No.: 11/578,978

(22) PCT Filed: Apr. 10, 2006

(86) PCT No.: PCT/JP2006/307533

§ 371 (c)(1),
(2), (4) Date: Oct. 18, 2006

(87) PCT Pub. No.: WO2006/115021

PCT Pub. Date: Nov. 2, 2006

(65) Prior Publication Data

US 2009/0235078 A1    Sep. 17, 2009

(30) Foreign Application Priority Data

Apr. 18, 2005    (JP) .............................. 2005-120095

(51) Int. Cl.
H04K 1/00    (2006.01)
H04L 9/00    (2006.01)
H04L 9/28    (2006.01)
H04L 9/30    (2006.01)
H04L 9/32    (2006.01)

(52) U.S. Cl. .............................. 380/28; 380/30; 380/44; 380/282; 380/285; 380/277; 713/170; 713/176; 713/180

(58) Field of Classification Search .................. 380/28, 380/30, 44, 277, 278, 282, 285; 713/150, 713/168, 175, 176, 180, 170
See application file for complete search history.

(56) References Cited

U.S. PATENT DOCUMENTS 6,081,597 A    6/2000    Hoffstein et al.

(Continued)

FOREIGN PATENT DOCUMENTS

JP    2000-516733    12/2000

(Continued)

OTHER PUBLICATIONS

Gentry et al., "Cryptanalysis of the Revised NTRU Signature Scheme", 2002, pp. 299-320, Advances in Cryptology—EUROCRYPT 2002.*

(Continued)

*Primary Examiner*—Matthew B Smithers
*Assistant Examiner*—Hilary Branske
(74) *Attorney, Agent, or Firm*—Wenderoth, Lind & Ponack, L.L.P.

(57) ABSTRACT

A signature generation apparatus and a signature verification apparatus preventing an occurrence of an inappropriate signature verification error. The signature generation apparatus (110) including a signature generation unit (114) calculating signature vector (s, t) for a message m using a private key, and generating signature data S indicating polynomials sl and sh specifying the polynomial s and a polynomial th which is a quotient when the polynomial t is divided by q.

16 Claims, 13 Drawing Sheets

U.S. PATENT DOCUMENTS

| | | | |
|---|---|---|---|
| 6,298,137 | B1 | 10/2001 | Hoffstein et al. |
| 2003/0120929 | A1 | 6/2003 | Hoffstein et al. |
| 2004/0078414 | A1* | 4/2004 | Geiringer et al. ............ 708/530 |
| 2004/0151309 | A1* | 8/2004 | Gentry et al. ................. 380/30 |
| 2007/0274518 | A1* | 11/2007 | Futa et al. ..................... 380/30 |

FOREIGN PATENT DOCUMENTS

| | | |
|---|---|---|
| JP | 2005-515659 | 5/2005 |
| WO | 03/050998 | 6/2003 |

OTHER PUBLICATIONS

Min et al., "On the security of NTRUSign signature scheme", 2004, Symposium on Cryptography and Information Security, The Institute of Electronics, Information and Communication Engineers.*

Howgrave-Graham et al., "The Impact of Decryption Failures on the Security of NTRU Encryption", 2003, Advances in Cryptology—CRYPTO 2003, pp. 226-246.*

Stam, "A Key Encapsulation Mechanism for NTRU", 2005, Cryptography and Coding, pp. 410-427.*

J. Hoffstein, J. Pipher, and J.H. Silverman, "*NTRU: A Ring Based Public Key Cryptosystem*", Lecture Notes in Computer Science, 1423, pp. 267-288, Springer-Verlag, 1998.

J. Hoffstein, J. Pipher, and J. H. Silverman, "*NSS: An NTRU Lattice Based Signature Scheme*", Advances in Cryptology-Eurocrypt'01, LNCS, vol. 2045, pp. 123-137, Springer-Verlag, 2001.

J. Hoffstein, N. Graham, J. Pipher, J. Silverman and W Whyte, "*NTRUSIGN: Digital Signatures Using the NTRU Lattice*", CT-RSA'03, LNCS, vol. 2612, pp. 122-140, Springer-Verlag, 2003.

"*Efficient Embedded Security Standards (EESS) EESS#1: Implementation Aspects of NTRUENCRYPT and NTRUSIGN*" Ver. 2.0, Jun. 20, 2003.

* cited by examiner

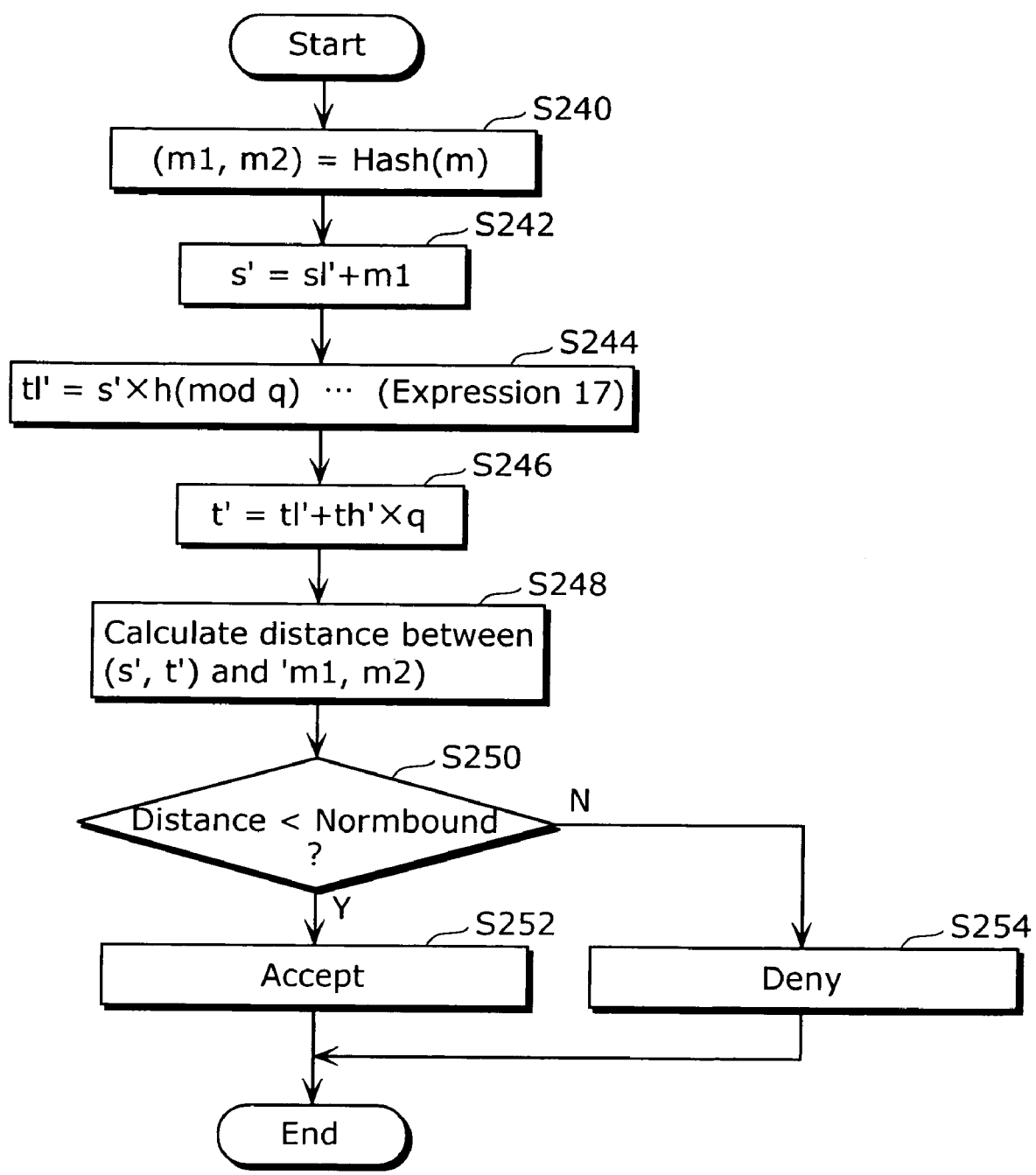

SIGNATURE GENERATION DEVICE AND SIGNATURE VERIFICATION DEVICE

BACKGROUND OF THE INVENTION

1. Field of Invention

The present invention relates to an encryption technology as an information security technology, and in particular to a signature generation apparatus and a signature verification apparatus which perform processing based on a digital signature.

2. Description of the Related Art

A digital signature scheme, which is a kind of public key cryptosystem, is provided as a technology for preventing a sender from being identified and data from being tampered with during the transmission of the data from a receiving apparatus to a transmitting apparatus.

In the digital signature scheme, the transmitting apparatus generates signature data for the data to be transmitted, using a private key of the transmitting apparatus, and transmits the data and the signature data to the receiving apparatus. The receiving apparatus verifies the signature data using a public key of the transmitting apparatus, and judges whether or not the data has been tampered with (e.g. see Non-Patent Reference 1). Note that it is difficult to calculate a value of the private key using the public key.

An NTRU (a trademark of NTRU Cryptosystems, Inc.) cryptosystem has been proposed as a public key cryptosystem capable of high-speed processing (e.g. see Non-Patent Reference 2). In the NTRU cryptosystem, encryption and decryption are performed using polynomial operations which enable computation at a speed higher than that achieved in the RSA (Rivest Shamir Adleman) cryptosystem, in which modulo exponentiation is performed under certain modulo, and also higher than the speed achieved in an elliptic-curve cryptosystem in which scalar multiplications are performed on points on an elliptic curve. It is therefore possible to perform processing of a higher speed than the existing public key cryptosystems, and software processing can be carried out within a practical period of time.

Thus, encrypted communication system using the NTRU cryptosystem for a public key cryptosystem have an advantage in that processing between a transmitting apparatus and a receiving apparatus can be performed at a speed higher than those achieved in the encrypted communication systems using the existing public key cryptosystem.

The method suggested in the Non-Patent Reference 2 is a confidentiality cryptosystem for encrypting data. However, later on, a digital signature scheme based on the NTRU cryptosystem is proposed (e.g. see Non-Patent Reference 3). This digital signature scheme has been modified several times due to the arrival of decryption methods.

The following briefly describes a digital signature scheme called NTRUSign (hereinafter referred to as "NTRUSign signature scheme") (e.g. see Patent Reference 1 and Non-Patent Reference 4).

<NTRUSign Signature Scheme>

(1) Parameters in NTRUSign Signature Scheme

In the NTRUSign signature scheme, non-negative integer parameters such as N, q, df, dg and Normbound are used. The following explains the meanings of these parameters.

(i) Parameter N

The NTRUSign signature scheme is a digital signature scheme which performs signature generation and signature verification using polynomial operations. The degree of polynomials used in the NTRUSign signature scheme is determined by the parameter N mentioned above.

The polynomials used in the NTRUSign signature scheme are integer coefficient polynomials of degree (N−1) or lower with respect to the parameter N, e.g. X^4+X^3+1 when N=5. Here, "X^a" shall denote the "a th" power of X. Also, a public key h and a signature s are both expressed as polynomials of degree (N−1) or lower. A private key is a set of four polynomials (f, g, F, G) of degree (N−1) or lower. That is to say, f, g, F and G are all polynomials of degree (N−1) or lower. Note that, hereinafter, a set of (f, g, F, G) made up of four polynomials may be represented as {(f, g), (F, G)}, in some cases, regarding the set to be made up of two pairs of (f, g) and (F, G).

A polynomial operation is computed so that the computation always results in a polynomial of degree (N−1) or lower, using the relational expression X^N=1 with respect to the parameter N. For example, assuming that "x" represents a product of a polynomial and a polynomial, and "·" represents a product of an integer and a polynomial (or a product of an integer and an integer), when N=5, a product of the polynomial X^4+X^2+1 and the polynomial X^3+X is computed as indicated below, using the relational expression X^5=1 so that the computation always results in a polynomial of degree N−1 or lower.

$$(X^4 + X^2 + 1) \times (^3 + X) = X^7 + 2 \cdot X^5 + 2 \cdot X^3 + X$$
$$= X^2 \cdot 1 + 2 \cdot 1 + 2 \cdot X^3 + X$$
$$= 2 \cdot X^3 + X^2 + X + 2$$

Note that, in the NTRUSign signature scheme, a polynomial a of degree (N−1) expressed as a=a_0+a_1·X+a_2·X^2+ . . . +a_(N−1)·X^(N−1) is identified as a vector (a_0, a_1, a_2, . . . , a_(N−1)). Here, a_0, a_1, a_2, . . . , a_(N−1) are coefficients of the polynomial a, and are integer numbers.

(ii) Parameter q

In the NTRUSign signature scheme, a parameter q, which is an integer number of 2 or greater, is used. The coefficients in a polynomial that appears in the NTRUSign signature scheme obtain a remainder modulo q.

(iii) Parameters df and dg

The method for selecting a polynomial f which is a part of the private keys used in the NTRUSign signature scheme and a polynomial g to be used together with the polynomial f for generating a public key polynomial h is determined based on the parameters df and dg.

First, the polynomial f is selected so that df coefficients indicate "1" and other coefficients indicate "0". In other words, the polynomial f is a polynomial of degree (N−1) or lower, having N coefficients that range from coefficients of degree 0 (constant term) to degree (N−1), and the polynomial f is selected so that df coefficients indicate 1, and (N-df) coefficients indicate 0 out of such N coefficients. Then, the polynomial g is selected so that dg coefficients indicate "1", and other coefficients indicate "0".

(iv) Parameter Normbound

In the NTRUSign signature scheme, a distance between a 2·N-degree vector created from the signature s, and a 2·N-degree vector which is a hash value of message data (hereinafter simply referred to as "message") is calculated, and whether or not the signature s is an authorized signature is judged based on the distance. Normbound is a threshold value to be used for the judgment. That is to say, in the case where the distance is smaller than Normbound, the signature s is accepted as an authorized signature, while in the case where the distance equals to or greater than Normbound, the signature s is denied as an unauthorized signature. Note that the Non-Patent Reference 4 introduces an example of (N, q, df, dg, Normbound)=(251, 128, 73, 71, 310) as an example of the parameters used in the NTRUSign signature scheme.

(2) Hash Value of Message and Distance Between Norm and Vector

In the NTRUSign signature scheme, a signature is created for a hash value of a message. The hash value of a message is a pair of polynomials of degree N, and is identified as a 2·N degree vector. Note that the Non-Patent Reference 1 describes in detail hash function for deriving a hash value based on a message.

In the NTRUSign signature scheme, a distance between vectors is used in signature verification, and a norm (Centered norm) is used for the calculation of such a distance. The following defines a distance between a norm and a vector.

A norm $\|a\|$ of the polynomial $a = a\_0 + a\_1 \cdot X + a\_2 \cdot X^2 + \ldots + a\_(N-1) \cdot X^{(N-1)}$ is defined as below.

$$\|a\| = sqrt((a\_0-p)^2 + (a\_1-p)^2 \ldots + (a\_(N-1)-p)^2) \mu = (1/N) \cdot (a\_0 + a\_1 + a\_2 + \ldots + a\_(N-1))$$

Here, sqrt (x) denotes square root of x.

A norm $\|(a, b)\|$ of the pair (a, b) of the polynomials a and b is defined as indicated below.

$$\|(a,b)\| = sqrt(\|a\|^2 + \|b\|^2)$$

A distance (inter-vector distance) between the pair (a, b) of the polynomials a and b and the pair (c, d) of the polynomials c and d is defined as $\|(c-a, d-b)\|$.

(3) Key Generation in the NTRUSign Signature Scheme As described above, in the NTRUSign signature scheme, the polynomials f and g are generated at random using the parameters df and dg. As is described in the Non-Patent Reference 4, the polynomial h is generated using the polynomial Fq which satisfies $Fq \times f = 1 (mod\ q)$ by the expression $h = Fq \times g (mod\ q)$. Moreover, the polynomials F and G with small norms are derived so as to satisfy the following expression.

$$f \times G - g \times F = q$$

Here, it is assumed that $\{(f, g), (F, G)\}$ denotes a private key and h denotes a public key. The private key is a key for generating a signature and is also called a signature generation key. The public key is a key for verifying a signature and is also called a signature verification key.

Here, $x = y(mod\ q)$ is an operation which obtains, as the coefficient of "i th" degree in the polynomial x, a remainder obtained when the coefficient of "i th" degree in the polynomial y is divided by modulo q so that the remainder indicates a value ranging from "0" to "(q-1)" ($0 \leq i \leq N-1$). That is to say that it is an operation which obtains, as the polynomial x, a polynomial to which the mod q operation is performed so that each of the coefficients in the polynomial y indicates a value ranging from "0" to "(q-1)".

(4) Signature Generation in the NTRUSign Signature Scheme

In the signature generation according to the NTRUSign signature scheme, a signature s of a message m for which a signature should be generated is calculated. First, a 2·N-degree vector (m1, m2) (m1 and m2 are polynomials of degree N), which is a hash value for the message m, is calculated.

The polynomials a, b, A and B are calculated so as to satisfy the expression below using the 2·N-degree vector (m1, m2) and the private key $\{(f, g), (F, G)\}$.

$$G \times m1 - F \times m2 = A + q \times B$$

$$-g \times m1 + f \times m2 = a + q \times b$$

Here, it is presumed that each of the coefficients in the polynomials "A" and "a" is a remainder obtained when divided by q so that the remainder indicates a value ranging from "<-q/2>+1" to "<q/2>". In other words, in the case where the remainder obtained when divided by q indicates a value ranging from "<q/2>" to "q-1", the remainder is adjusted through the subtraction of q so as to fall within the above-mentioned range. Here, <x> indicates the largest value among the values indicating x or smaller. For example, $<-\frac{1}{2}> = -1$.

Next, polynomials s and t are calculated using the expressions below, and the polynomial s is outputted as a signature.

$$s = f \times B + F \times b (mod\ q)$$

$$t = g \times B + G \times b (mod\ q)$$

FIG. 1 is a diagram for describing how to generate a signature s.

In the NTRUSign signature scheme, a nearest-neighbor lattice point P of a hash value H (m)=(m1, m2) for the message m is derived based on the above expressions $s = f \times B + F \times b (mod\ q)$ and $t = g \times B + G \times b (mod\ q)$, on a lattice of degree 2·N extended by a private key sequence $\{(f, g), (F, G)\}$. That is to say, a lattice point that is the nearest to (m1, m2) is found out as the nearest-neighbor lattice point P. Then, only the polynomial s of a signature vector (s, t) indicating the nearest-neighbor lattice point P is regarded as a signature.

(5) Signature Verification in the NTRUSign Signature Scheme

In the signature verification according to the NTRUSign signature scheme, whether or not the signature s is an authorized signature of the message m for which the signature s has been generated is verified. First, a 2·N-degree vector (m1, m2), which is a hash value for the message m is calculated.

The polynomial t is calculated based on the following expression using the public key h.

$$t = s \times h (mod\ q)$$

A distance between the 2·N-degree vectors (s, t) and (m1, m2) is obtained, and whether or not the distance is smaller than Normbound is checked. In the case where the distance is smaller than Normbound, the signature s is judged to be authorized and then accepted. In the case where the distance equals to or greater than Normbound, the signature s is judged to be unauthorized and then denied.

FIG. 2 is a diagram for describing a method for verifying a signature s.

In the NTRUSign signature scheme, the lattice point P (s, t) in the 2·N-degree lattice extended by a public key sequence $\{(1, h), (0, q)\}$ is derived based on the above-mentioned expression $t = s \times h (mod\ q)$ using the signature s and the public key h. Here, in such a 2·N-degree lattice, it is judged whether or not the hash value H (m)=(m1, m2) for a message m is within a hypersphere whose radius equals to Normbound with the lattice point P (s, t) in the center. In the case where the hash value is within the hypersphere, the signature s is judged to be authorized and then accepted, whereas in the case where the hash value is not within the hypersphere, the signature s is judged to be unauthorized and then denied.

Here, in the NTRUSign signature scheme as described above, there is a case where an authorized signature s is judged to be "unauthorized" in the signature verification.

The following shows an example of signature verification error when N is 2. Hereinafter, a distance between s and m1 will be focused. Assuming that q=128, m1=(1, 127) and s=(-3, 124). Here, s mod q=(125, 124). It is defined that m1-s=(4, 3) and the distance between m1 and s is expressed by $\|m1 - $ s‖=sqrt((4-3.5)^2+(3-3.5)^2=sqrt (0.5). However, with m1−(s mod q)=(−124, 3), a distance between m1 and (s mod q) is expressed by ‖m1−(s mod q)‖=sqrt ((−124−(−60.5)) ^2+(3−(−60.5))^2)=sqrt (8064.5), and the distance becomes larger. In the case where Normbound is small, the distance gets larger because a remainder modulo q is derived with respect to s, which leads to the judgment that the signature, though authorized, is unauthorized and inappropriate signature verification error is caused.

Based on this, a method for preventing the occurrence of such an inappropriate signature verification error as described above is suggested (e.g. see Non-Patent Reference 5). To be more precise, in the signature verification, a polynomial s'=(s mod q)+(a, . . . , a) mod q is calculated by adding vectors norms of which indicate 0 with respect to s mod q and obtaining a remainder modulo q. Then, t'=s×h (mod q) is calculated using s' and the public key h so as to obtain a distance between the 2·N-degree vectors (s', t') and (m1, m2), and whether or not the distance is smaller than Normbound is checked. That is to say, a value ranging from "1" to "q−1" is substituted into a so that the distance is obtained for the respective cases, and whether or not the respective distances are smaller than Normbound is checked. As a result, in the case where any of the distances is smaller than Normbound, the signature s is judged to be authorized and then accepted. On the other hand, in the case where the distances with respect to the value of a ranging from "1" to "q−1", the signature s is judged to be unauthorized and then denied.

Here, in the above-mentioned case, if (a, a) where a=3 is added to s mod q=(125, 124), s' is expressed by s'=(s mod q)+(a, a)=(125, 124)+(3, 3)=(128, 127)=(0, 127) mod q. Here, the distance between m1 and s' is expressed by ‖m1−s'‖=‖(1, 0)‖=sqrt ((1-0.5)^2+(0-0.5)^2)=sqrt (0.5), which is the same as the distance between m1 and s. Thus, in such a case, a signature is judged to be authorized in the verification of the signature if the signature is generated correctly, and therefore, it is possible to prevent inappropriate signature verification error.

Patent Reference 1: International Publication Bulletin No. 03/050998.

Non-Patent Reference 1: Tatsuaki Okamoto, and Hirosuke Yamamoto, Modern Cryptography, Sangyo Tosho, 1997.

Non-Patent Reference 2: Hoffstein, J. Pipher, and J. H. Silverman, "NTRU: A ring based public key cryptosystem", Lecture Notes in Computer Science, 1423, pp. 267-288, Springer-Verlag, 1998. Non-Patent Reference 3: J. Hoffstein, J. Pipher and J. Silverman, "NSS: An NTRU Lattice Based Signature Scheme," Advances in Cryptology-Eurocrypt'01, LNCS, Vol. 2045, pp. 123-137, Springer-Verlag, 2001.

Non-Patent Reference 4: J. Hoffstein, N. Graham, J. Pipher, J. Silverman and W. Whyte, "NTRUSign: Digital Signatures Using the NTRU Lattice," CT-RSA'03, LNCS, Vol. 2612, pp. 122-140, Springer-Verlag, 2003.

Non-Patent Reference 5: "Efficient Embedded Security Standards (EESS) EESS#1: Implementation Aspects of NTRUEncrypt and NTRUSign," Ver. 2.0, Jun. 20, 2003.

BRIEF SUMMARY OF THE INVENTION

However, even with the method disclosed in the Non-Patent Reference 5, inappropriate signature verification error may be caused.

With the method of the Non-Patent Reference 5, an inappropriate signature verification error is caused in the following case.

For example, assuming that q=128, m1=(−2, 127) and s=(0, 129) are defined. Here, s mod q=(0, 1). It is defined that m1−s=(−2, −2) and the distance between m1 and s is expressed by ‖m1−s‖=sqrt ((−2−(−2))^2+(−2−(−2))^2)=0. However, since m1−(s mod q)=(−2, 126), the distance between m1 and s mod q is expressed by ‖m1−(s mod q)‖=sqrt ((−2−62)^2+(126−62)^2)=sqrt (8192) and the distance gets larger. Here, the method of the Non-Patent Reference 5 is attempted. However, a difference between a largest value 129 and a smallest value 0 of the elements in the polynomial s is 129 and thus exceeds q=128. Therefore, it is not possible, with the method of the Non-Patent Reference 5, to obtain a polynomial s' where the difference between the largest value and the smallest value is 129 even though (a, a) is added to the polynomial s and a remainder modulo q is obtained with respect to the addition result.

Therefore, in the case where the difference between the largest value and the smallest value of the elements in the polynomial s exceeds q, the obtainment of the remainder modulo q with respect to the polynomial s (i.e., s mod q operation) causes lack of information, which leads to the occurrence of inappropriate signature verification error.

The present invention is therefore conceived in view of the above-mentioned problems, and an object of the present invention is to provide a signature generation apparatus and a signature verification apparatus which can surely prevent the occurrence of inappropriate signature verification error.

In order to achieve the above object, the signature generation apparatus of the present invention is a signature generation apparatus which generates signature data for message data according to a signature scheme, wherein the signature scheme includes a key generation step of (a) generating elements f and g of a ring R, and an element Fq with respect to the ring R and a positive integer q, the ring R being a set of N-dimensional arrays and defining addition, subtraction, multiplication, and a norm which indicates a size of an element, the element Fq being an inverse number of f(mod q) which denotes a remainder obtained when f is divided by q, (b) generating, as a public key, an element h which is congruent, modulo q, to a product which is derived as a result of multiplying the element g and the element Fq, (c) generating elements F and G so as to satisfy f×G−g×F=q, where "x" denotes multiplication of the ring R, and (d) generating, as a private key, a set {f, g, F, G} which includes the four elements f, g, F and G; a signature generation step of generating the signature data for the message data using the private key, the signature data being an element of the ring R; and a signature verification step of verifying the signature data using the public key, and the signature generation apparatus includes: a signature vector generation unit which calculates, for the message data, a signature vector made up of elements s and t of the ring R, using the private key; and a signature data generation unit which generates the signature data indicating a first element of the ring R, and a second element of the ring R. The first element is capable of specifying the element s, and the second element is a quotient when the element t is divided by q. The first element is made up of an element sh and an element sl of the ring R. The element sh is a quotient when the element s is divided by q, and the element sl is a remainder when the element s is divided by q.

Thus, the signature data indicates a first element which specifies an element s, and a second element which is a quotient when an element t is divided by q. Therefore, the signature verification apparatus, having obtained the signature data and message data, can properly decrypt the element s which is a part of the signature vector, using the first element indicated by the signature data. For example, in the case where the first element is made up of elements sh and sl which are respectively a quotient and a remainder obtained when the element s is divided by q, the signature verification apparatus can properly decrypt the element s by multiplying the element sh with q and adding the element sl to the result of the multiplication. In addition, the signature verification apparatus can properly decrypt the element t which is a part of the signature vector, using the result of multiplying, with q, the second element indicated by the signature data. For example, by adding a remainder, modulo q, of a product of the element sl and the product h to a product of the second element and q, the element t can be properly decrypted. Thus, with the present invention, signature data by which the elements s and t can properly decrypted by the signature verification apparatus is generated without performing (mod q) operation on the elements s and t which make up a signature vector. It is therefore possible to surely prevent the occurrence of inappropriate signature verification error as caused in the conventional examples. In other words, even in the case where a difference between the largest value and the smallest value of the elements in the element s exceeds q, it is possible to cause the signature verification apparatus to perform proper signature verification based on the element s without letting the information on the element s be missing.

The signature generation apparatus may further include a hash value generation unit which generates elements m1 and m2 of the ring R by applying hash function to the message data, wherein the signature data generation unit generates, as the first element, a difference between the element s and the element m1.

Thus, the first element is a difference between the element s and the element m1, so that the signature verification apparatus, having obtained signature data and message data, can properly decrypt the element s which is a part of the signature vector, using the first element indicated by the signature data. That is to say that the signature verification apparatus can properly decrypt the element s by generating an element m1 by applying hash function to the message data, and then, adding the element m1 to the first element. Also, the first element is a difference between the element s and the element m1. It is therefore possible to reduce the information amount of the first element, namely, the information amount of the signature data, as compared with the case in which the first element is made up of the elements sl and sh. Moreover, by adding a product of the second element and q to the remainder, modulo q, of a product of the element s and the element h, the signature verification apparatus can properly decrypt the element t which is a part of the signature vector.

The signature vector generation unit may calculate the element s so that an "i th" sub-element of the element m1 and an "i th" sub-element of the element s indicate same values, where i denotes one of integer numbers ranging from 1 to N. For example, the signature vector generation unit may calculate the element s by adding or subtracting an element, of the ring R, which has a norm of 0.

Thus, the element s is calculated in such a manner that an "i th" sub-element of the element s equals to an "i th" sub-element of the element m1 through addition or subtraction of an element having a norm of 0. Therefore, an "i th" sub-element of the first element becomes 0, which can approximate values of other elements to 0, and thereby, it is possible to reduce the information amount of the first element, that is, the information amount of the signature data. Also, through the addition or subtraction of the element having a norm of 0, a value of the "i th" sub-element of the element s is adjusted. Therefore, it is possible to perform the adjustment as described above without changing the norm of the element s once calculated, and to maintain, for the adjustment, the distance between the signature vector and the hash value vector made up of the elements m1 and m2.

The signature verification apparatus according to the present invention is a signature verification apparatus which verifies signature data for message data according to a signature scheme, wherein the signature scheme includes: a key generation step of (a) generating elements f and g of a ring R, and an element Fq with respect to the ring R and a positive integer q, the ring R being a set of N-dimensional arrays and defining addition, subtraction, multiplication, and a norm which indicates a size of an element, the element Fq being an inverse number of f(mod q) which denotes a remainder obtained when f is divided by q, (b) generating, as a public key, an element h which is congruent, modulo q, to a product which is derived as a result of multiplying the element g and the element Fq, (c) generating elements F and G so as to satisfy f×G−g×F=q, where "x" denotes multiplication of the ring R, and (d) generating, as a private key, a set {f, g, F, G} which includes the four elements f, g, F and G; a signature generation step of generating the signature data for the message data using the private key, the signature data being an element of the ring R; and a signature verification step of verifying the signature data using the public key, and the signature verification apparatus comprises: a signature vector generation unit which decrypts an element s of a signature vector made up of elements s and t of the ring R, using a first element of the ring R, and decrypt the element t of the signature vector using a result of multiplying a second element of the ring R and q, the first and second elements being indicated by the signature data, and the signature vector being calculated for the message data using the private key; and a verification unit which verifies the signature vector. For example, the first element is made up of an element sh and an element sl of the ring R, the element sh being a quotient when the element s is divided by q, and the element sl being a remainder when the element t is divided by q, and the signature vector generation unit is operable to decrypt the element s by multiplying the element sh with q and adding the element sl to a result of the multiplication, and decrypt the element t by adding a product of the second element and q to a remainder, modulo q, of a product of the element sl and the element h.

Thus, the signature data indicates a first element which can specify the element s, and a second element which is a quotient when the element t is divided by q. The signature verification apparatus, having obtained the signature data and the message data, can therefore properly decrypt the element s which is a part of the signature vector, using the first element indicated by the signature data. For example, in the case where the first element is made up of the elements sh and sl which are respectively a quotient and a remainder obtained when the element s is divided by q, the signature verification apparatus can properly decrypt the element s by multiplying the element sh with q and adding the element sl to the result of the multiplication. In addition, the signature verification apparatus can properly decrypt the element t which is a part of the signature vector, using the result of multiplying, with q, the second element indicated by the signature data. For example, it is possible to properly decrypt the element t by adding a product of the second element and q to a remainder, modulo q, of a product of the element sl and the element h.

The signature verification apparatus may further include a hash value generation unit which generates elements m1 and m2 of the ring R by applying hash function to the message data, wherein the first element includes an element sl of the ring R, the element sl being a difference between the element s and the element m1, and the second element is a quotient when the element t is divided by q, and the signature vector generation unit decrypts the element s by adding the element m1 to the element s1, and decrypt the element t by adding a product of the second element and q to a remainder, modulo q, of a product of the element s and the element h.

Thus, the first element is a difference between the element s and the element m1. Therefore, the signature verification apparatus, having obtained the signature data and the message data, can properly decrypt the element s which is a part of the signature vector, using the first element indicated by the signature data. In other words, the signature verification apparatus can properly decrypt the element s by generating the element m1 by applying hash function to the message data and adding the element m1 to the first element. In addition, the signature verification apparatus can properly decrypt the element t which is a part of the signature vector by adding a product of the second element and q to the remainder, modulo q, of a product of the element s and the element h.

Note that the present invention can be realized not only as such signature generation apparatus and signature verification apparatus, but also as a method or a program thereof, and even as a storage medium storing the program or as an integrated circuit.

The signature generation apparatus and the signature verification apparatus according to the present invention produce the effect of surely preventing the occurrence of inappropriate signature verification error, and therefore, their values are high.

BRIEF DESCRIPTION OF DRAWINGS

FIG. 14 is a flowchart showing an operation of the signature verification unit according to the second embodiment of the present invention.

DETAILED DESCRIPTION OF THE INVENTION

First Embodiment

Figure 1:
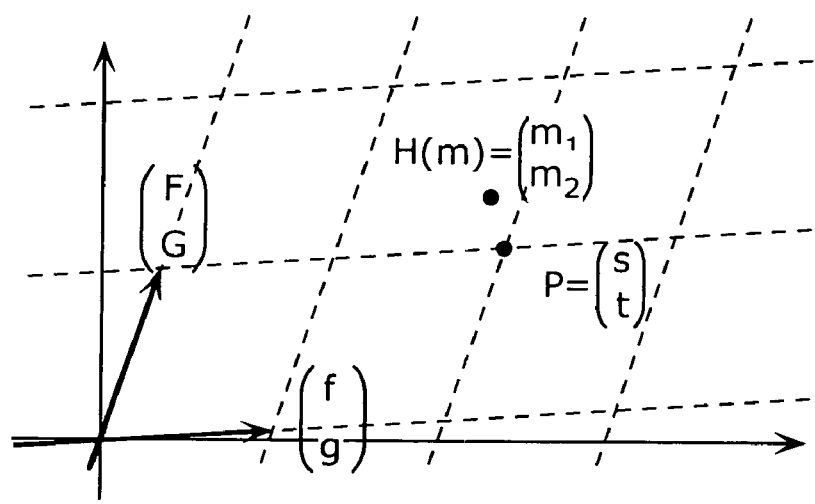
FIG. 1 is a diagram for describing a method of generating a signature.
Figure 2:
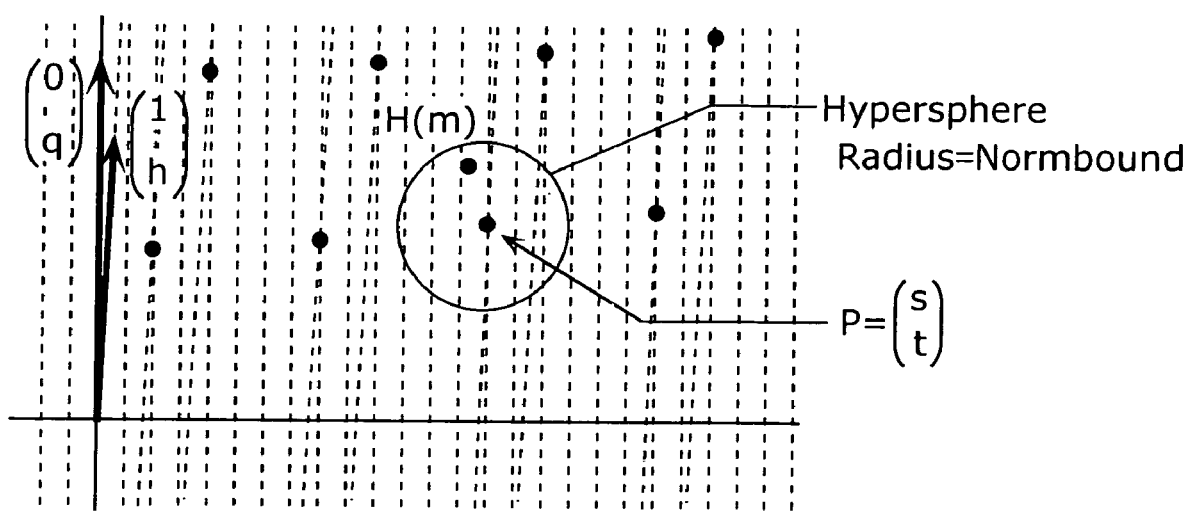
FIG. 2 is a diagram for describing a method of verifying a signature.

An improved NTRUSign signature scheme according to the first embodiment of the present invention is an improved version of the conventional NTRUSign signature scheme, for generating a signature in such a manner that the occurrence of inappropriate signature verification error can be prevented, and verifying the generated signature.

The following describes in detail the improved NTRUSign signature scheme 1 according to the present embodiment.

<Improved NTRUSign Signature Scheme 1>

(1) Parameters in the Improved NTRUSign Signature Scheme 1

In the improved NTRUSign signature scheme 1, non-negative integer parameters such as N, q, df, dg and Normbound are used. The definitions of these parameters are as same as those given by the conventional NTRUSign signature scheme. The following describes the meanings of these parameters.

(i) Parameter N

The improved NTRUSign signature scheme 1 is a digital signature scheme which performs signature generation and signature verification using polynomial operations. The degree of polynomials used in the NTRUSign signature scheme 1 is determined by the parameter N described above.

The polynomials used in the improved NTRUSign signature scheme 1 are integer coefficient polynomials of degree N−1 or lower with respect to the parameter N, for example, $X^4+X^3+1$ when N=5. Here, "$X^a$" shall denote the "a th" power of X. A public key h and a polynomial s which is a part of the signature vector are both expressed as polynomials of degree N−1 or lower. A private key is a set of four polynomials (f, g, F, G) of degree (N−1) or lower. In other words, f, g, F and G are all polynomials of degree N−1 or lower. Note that, hereinafter, a set of (f, g, F, G) made up of four polynomials may be represented as {(f, g), (F, G)}, in some cases, regarding the set to be made up of two pairs of (f, g) and (F, G).

A polynomial operation is computed so that the computation always results in a polynomial of degree (N−1) or lower, using the relational expression $X^N=1$ with respect to the parameter N. For example, assuming that x presents a product of a polynomial and a polynomial, and ·presents a product of an integer and a polynomial (or a product of an integer and an integer), when N=5, a product of the polynomial $X^4+X^2+1$ and the polynomial $X^3+X$ is operated so as to result in a polynomial of degree N−1 or lower, as indicated below, based on the expression $X^5=1$.

$$(X^{\wedge}4 + X^{\wedge}2 + 1) \times (X^{\wedge}3 + X) = X^{\wedge}7 + 2 \cdot X^{\wedge}5 + 2 \cdot X^{\wedge}3 + X$$

$$= X^{\wedge}2 \cdot 1 + 2 \cdot 1 + 2 \cdot X^{\wedge}3 + X$$

$$= 2 \cdot X^{\wedge}3 + X^{\wedge}2 + X + 2$$

Note that, in the improved NTRUSign signature scheme 1, a polynomial a of degree (N−1) expressed as $a = a\_0 + a\_1 \cdot X + a\_2 \cdot X^2 + \ldots + a\_(N-1) \cdot X^{(N-1)}$ is identified as a vector ($a\_0, a\_1, a\_2, \ldots, a\_(N-1)$). Here, $a\_0, a\_1, a\_2, \ldots, a\_(N-1)$ are coefficients of the polynomial a, and are integer numbers.

(ii) Parameter q

In the improved NTRUSign signature scheme 1, a parameter q which is an integer number of 2 or greater is used. The coefficients in a polynomial that appears in the improved NTRUSign signature scheme 1 obtain a remainder modulo q.

(iii) Parameters df and dg

The method for selecting the polynomial f which is a part of the private keys used in the improved NTRUSign signature scheme, 1 as well as the polynomial g to be used together with the polynomial f in the generation of the public key polynomial h is determined by the parameters df and dg.

First, the polynomial f is selected so that df coefficients indicate 1, and other coefficients indicate 0. In other words, the polynomial f is a polynomial of degree (N-1) or lower, having N coefficients that range from coefficients of degree 0 (constant term) to degree (N-1), and the polynomial f is selected so that df coefficients indicate 1, and (N-df) coefficients indicate 0 out of such N coefficients. Then, the polynomial g is selected so that dg coefficients indicate "1", and other coefficients indicate "0".

(iv) Parameter Normbound

In the improved NTRUSign signature scheme 1, a distance between a 2·N-degree vector (signature vector) made up of the polynomials s and t, and a 2·N-degree vector which is a hash value of message data (hereinafter simply referred to as "message") is calculated, and whether or not a signature is authorized is checked based on the distance. Normbound is a threshold to be used for such a judgment. That is to say, in the case where the distance is smaller than Normbound, the signature is accepted as authorized, whereas in the case where the distance is equal to or greater than Normbound, the signature is denied as unauthorized. Note that the Non-Patent Reference 4 shows an example of (N, q, df, dg, Normbound)= (251, 128, 73, 71, 310) as an example of the parameters in the NTRUSign signature scheme. In the improved NTRUSign signature scheme 1, the same parameters as shown in the above-mentioned example may be used.

(2) Hash Value of Message and Distance Between Norm and Vector

In the improved NTRUSign signature scheme 1, a signature for a hash value of a message is created. The hash value of a message is a pair of polynomials of degree N, and is identified as a 2·N-degree vector. Note that the Non-Patent Reference 1 describes in detail hash function for obtaining a hash value based on a message.

In the improved NTRUSign signature scheme 1, a distance between vectors is used in the signature verification, as in the conventional NTRUSign signature scheme, and a norm (Centered norm) is used for the calculation of such a distance. The following defines a distance between a norm and a vector.

A norm $\|a\|$ of the polynomial $a=a\_0+a\_1\cdot X+a\_2\cdot X^2+\ldots+a\_(N-1)\cdot X^{(N-1)}$ is defined as below.

$$\|a\|=sqrt((a\_0-\mu)^2+(a\_-\mu)^2+\ldots+(a\_(N-1)-\mu)^2)$$

$$\mu=(1/N)\cdot(a\_0+a\_1+a\_2+\ldots+a\_(N-1))$$

Here, sqrt (x) denotes square root of x.

A norm $\|(a, b)\|$ of the pair (a, b) for the polynomials a and b is defined as below.

$$\|(a,b)\|=sqrt(\|a\|^2+\|b\|^2)$$

A distance (inter-vector distance) between the pair (a, b) of the polynomials a and b and the pair (c, d) of the polynomials c and d is defined as $\|(c-a, d-b)\|$.

(3) Key Generation in the Improved NTRUSign Signature Scheme 1

In the improved NTRUSign signature scheme 1, key generation is performed by the same method as used in the NTRUSign signature scheme. First, the polynomials f and g are generated at random using the parameters df and dg, as described above. As is described in the Non-Patent Reference 4, the polynomial h is generated using the polynomial Fq which satisfies Fq×f=1(mod q) by the expression h=Fq×g (mod q). Moreover, the polynomials F and G with small norms are derived so as to satisfy the following expression.

$$f \times G - g \times F = q$$

Here, it is assumed that $\{(f, g), (F, G)\}$ denotes a private key and h denotes a public key. The private key is a key for generating a signature and is also called a signature generation key.

Here, x=y(mod q) is an operation which obtains, as the coefficient of "i th" degree in the polynomial x, a remainder obtained when the coefficient of "i th" degree in the polynomial y is divided by modulo q so that the remainder indicates a value ranging from "0" to "(q-1)" ($0 \leq i \leq N-1$). That is to say that it is an operation which obtains, as the polynomial x, a polynomial to which the mod q operation is performed so that each of the coefficients in the polynomial y indicates a value ranging from "0" to "(q-1)".

(4) Signature Generation in the Improved NTRUSign Signature Scheme 1

In the signature generation according to the improved NTRUSign signature scheme 1, signatures sl, sh and th of a message m for which a signature is to be generated are calculated.

First, a 2·N-degree vector (m1, m2) (m1 and m2 are polynomials of degree N) which is a hash value for the message m is calculated.

The polynomials a, b, A and B are calculated so as to satisfy the expression below using the 2·N-degree vector (m1, m2) and a private key $\{(f, g), (F, G)\}$.

$$G \times m1 - F \times m2 = A + q \times B \quad \text{(Expression 1)}$$

$$-g \times m1 + f \times m2 = a + q \times b \quad \text{(Expression 2)}$$

Here, it is presumed that each of the coefficients in the polynomials A and a is a remainder obtained when divided by q so that the remainder indicates a value ranging from "<-q/2+1>" to "<q/2>". In other words, in the case where the remainder obtained when divided by q indicates a value ranging from "<q/2>" to "q-1", the remainder is adjusted through the subtraction of q so as to fall within the above-mentioned range. Here, <x> indicates the largest value among the values indicating x or smaller. For example, <-½>=-1.

The polynomials s and t are calculated by the following expressions (Expression 3) and (Expression 4).

$$s = f \times B + F \times b \quad \text{(Expression 3)}$$

$$t = g \times B + G \times b \quad \text{(Expression 4)}$$

Here, in the present embodiment, polynomials sl, sh and th are calculated so as to satisfy s=sl+sh×q and t=tl+th×q without obtaining a remainder modulo q with respect to the polynomials s and t. Note that each of the coefficients (each of the elements) in the polynomials sl and tl are non-negative integer numbers indicating q or smaller. In other words, the polynomials sl and sh are respectively a remainder and a quotient obtained when the polynomial s is divided by q, whereas the polynomials tl and th are respectively a remainder and a quotient when the polynomial t is divided by q. In the present embodiment, the polynomials sl, sh and th are regarded to represent a signature.

(5) Signature Verification in the Improved NTRUSign Signature Scheme 1

First, a 2·N-degree vector (m1, m2) which is a hash value for a message m is calculated. Then, the polynomial tl is calculated by the following expression (Expression 6) using the public key h.

$$tl = sl \times h \pmod{q} \quad \text{(Expression 6)}$$

In addition, the polynomials s and t are calculated using s=sl+sh×q and t=tl+th×q. That is to say that the polynomials s and t are calculated using the public key h and the polynomials sl, sh and th which represent a signature. Then, a distance between the 2·N-degree vectors (s, t) and (m1, m2) is obtained, and whether or not the distance is smaller than Normbound is checked. In the case where the distance is smaller than Normbound, the signature is judged to be authorized, and then is accepted. In the case where the distance is equal to or greater than Normbound, the signature is judged to be unauthorized, and then is denied.

Figure 3:
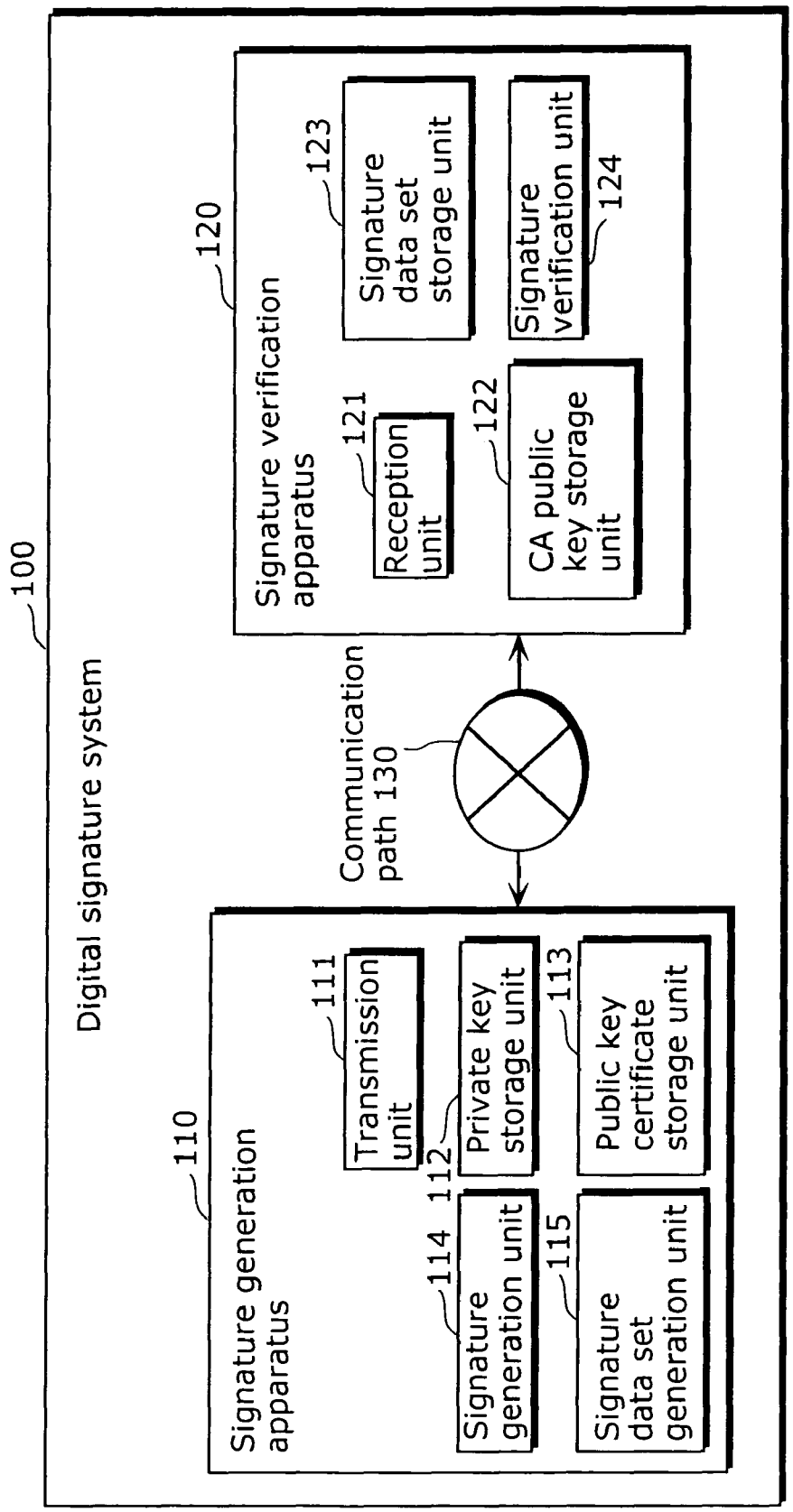
FIG. 3 is a block diagram showing a configuration of a digital signature system according to a first embodiment of the present invention.

FIG. 3 is a block diagram showing a configuration of a digital signature system 100 according to the present embodiment.

The digital signature system 100 generates a signature using the above-mentioned improved NTRUSign signature scheme 1 and verifies the generated signature. Such a digital signature 100 is comprised of a signature generation apparatus 110, a signature verification apparatus 120, and a communication path 130.

The signature generation apparatus 110 generates, based on the improved NTRUSign signature scheme 1, a signature data set SS which includes signature data S (data indicating the polynomials sl, sh and th) for an inputted message m, and transmits the signature data set SS to the signature verification apparatus 120 via the communication path 130. Such a signature generation apparatus 110 also includes a transmission unit 111, a private key storage unit 112, a public key certificate storage unit 113, a signature generation unit 114 and a signature data set generation unit 115.

The signature verification apparatus 120 receives the signature data set SS from the signature generation apparatus 110 via the communication path 130, and verifies the signature data S included in the signature data set SS, based on the improved NTRUSign signature scheme 1. Such a signature verification apparatus 120 also includes a reception unit 121, a CA public key storage unit 122, a signature data set storage unit 123, and a signature verification unit 124.

The following describes in detail the signature generation apparatus 110 according to the present embodiment.

The transmission unit 111 of the signature generation apparatus 110 transmits the signature data set SS to the signature verification apparatus 120 via the communication path 130.

The private key storage unit 112 stores a private key KS for generating the polynomial s for the message m. The private key KS shall be previously provided.

The public key certificate storage unit 113 stores a public key certificate CP of the public key KP (public key h) indicated by the polynomial h as indicated above. The public key certificate CP is made up of a public key KP, signature data SP of a public key KP issued by Certificate Authority. The signature data SP is also generated using the improved NTRUSign signature scheme 1. The public key certificate CP shall be previously provided. Note that the public key certificate CP may include data other than the public key KP and the signature data SP. For example, the public key certificate CP may include a user identifier and validity of the public key certificate CP.

The signature generation unit 114 generates the polynomials s and t for the message m using the private key KS stored in the private key storage unit 112, and further, generates signature data S (polynomials sl, sh and th) for verifying the polynomials s and t by decrypting them.

Figure 4:
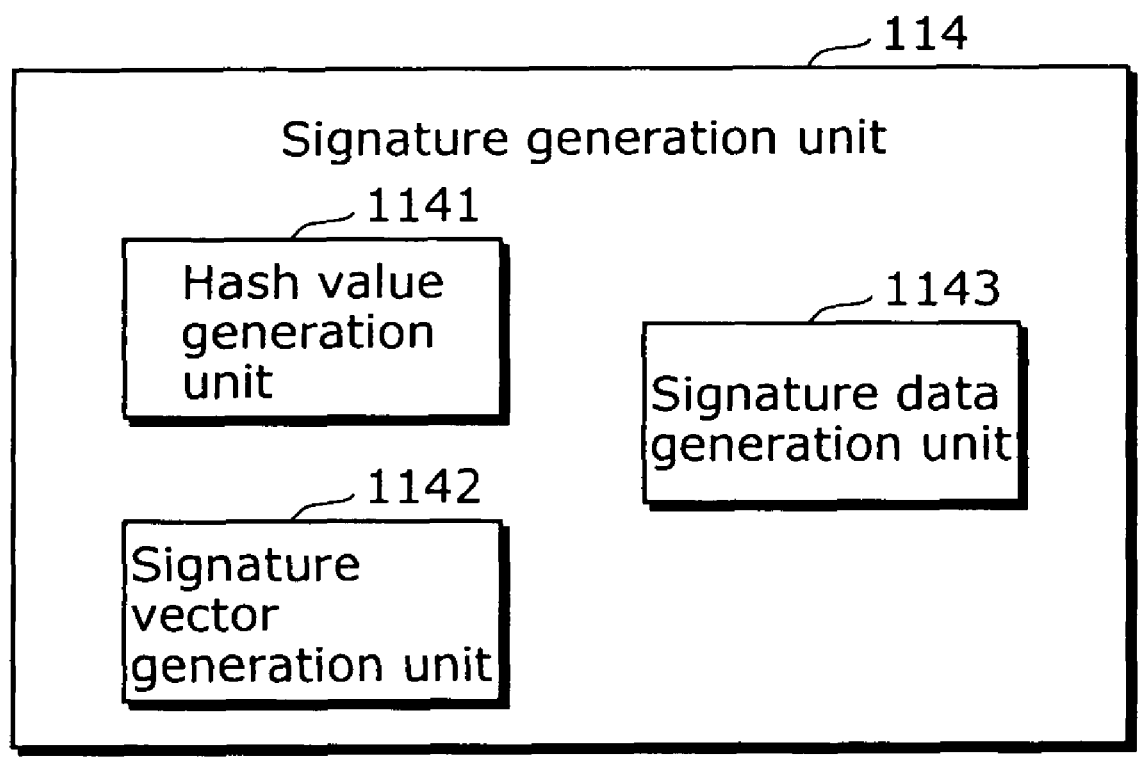
FIG. 4 is a block diagram showing a configuration of a signature generation unit according to the first embodiment of the present invention.

FIG. 4 is a block diagram showing a configuration of the signature generation unit 114 according to the present embodiment.

The signature generation unit 114 includes a hash value generation unit 1141, a signature vector generation unit 1142, and a signature data generation unit 1143.

The hash value generation unit 1141 calculates a 2·N-degree vector (m1, m2) (m1 and m2 are polynomials of N-degree), indicating a hash value for the message m.

The signature vector generation unit 1142 generates the polynomials s and t by the above-mentioned expressions (Expression 1) through (Expression 4), using the private key KS and the hash value H. In other words, the signature vector generation unit 1142 calculates a signature vector (s, t) indicating a nearest-neighbor lattice point P of the hash value H (m)=(m1, m2) for the message m on a lattice of degree 2·N extended by a private key sequence {(f, g), (F, G)}.

The signature data generation unit 1143 calculates the polynomials sl, sh and th so as to satisfy s=sl+sh×q and t=tl+th×q, using the polynomials s and t generated by the signature vector generation unit 1142, and generates the signature data S indicating the polynomials sl, sh and th.

Figure 5:
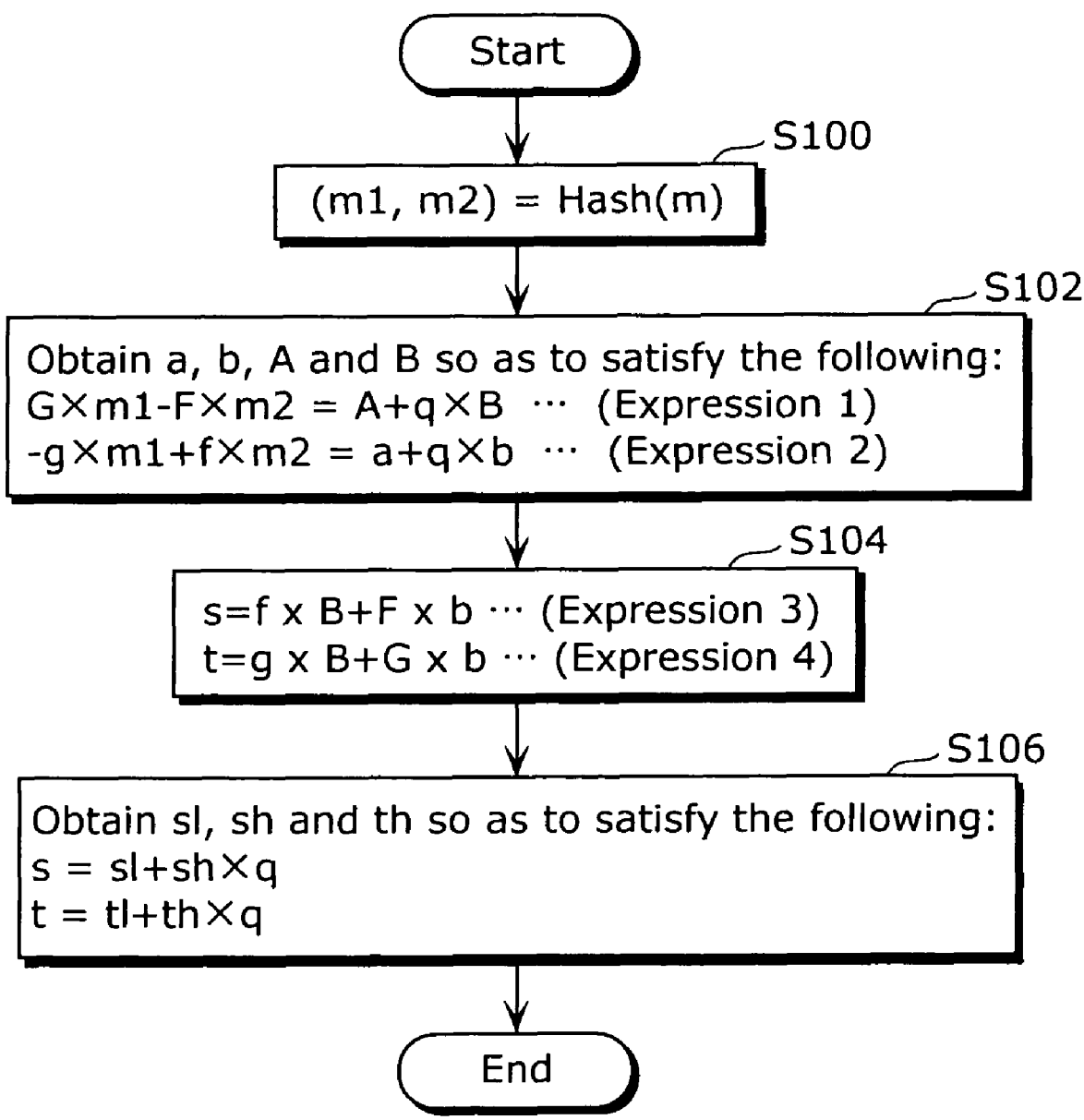
FIG. 5 is a flowchart showing an operation of the signature generation unit according to the first embodiment of the present invention.

FIG. 5 is a flowchart showing an operation of the signature generation unit 114.

First, the hash value generation unit 1141 of the signature generation unit 114 calculates the 2·N-degree vector (m1, m2) indicating the hash value H for the message m (Step S100).

Next, the signature vector generation unit 1142 of the signature generation unit 114 calculates the polynomials a, b, A and B so as to satisfy the expressions (Expression 1) and (Expression 2) indicated above (Step S102). In addition, the signature vector generation unit 1142 calculates the polynomials s and t using the expressions (Expression 3) and (Expression 4) indicated above (Step S104).

Then, the signature data generation unit 1143 of the signature generation unit 114 calculates the polynomials sl, sh and th so as to satisfy s=sl+sh×q and t=tl+th×q, using the polynomials s and t, and generates the signature data S indicating the polynomials sl, sh and th (Step S106).

Figure 6:
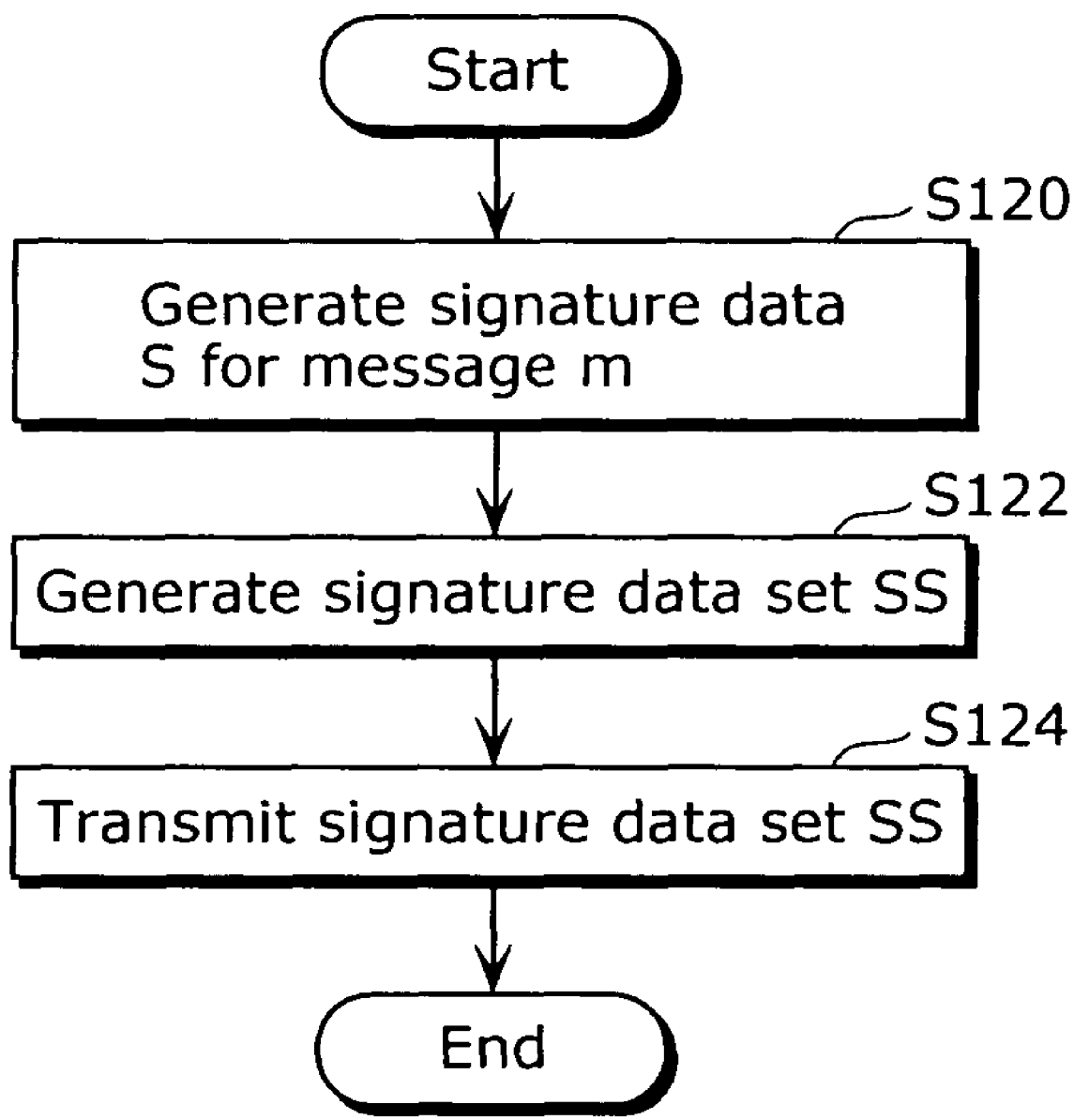
FIG. 6 is a flowchart showing an overall operation of the signature generation apparatus according to the first embodiment of the present invention.

FIG. 6 is a flowchart showing an overall operation of the signature generation apparatus 110.

The signature generation unit 114 of the signature generation apparatus 110 generates the polynomials s and t for the message m, using the private key KS stored in the private key storage unit 112, as well as generates the signature data S (data indicating the polynomials sl, sh and th) based on the polynomials s and t (Step S120).

Next, the signature data set generation unit 115 of the signature generation apparatus 110 generates signature data set SS made up of a message m, signature data S and the public key certificate CP stored in the public key certificate storage unit 113 (S step 122).

Then, the transmission unit 111 of the signature generation apparatus 110 transmits the signature data set SS to the signature verification apparatus 120 via the communication path 130 (Step S 124).

The following describes in detail the signature verification apparatus 120 according to the present embodiment.

The reception unit 121 of the signature verification apparatus 120 receives the signature data set SS transmitted from the signature generation apparatus 110 via the communication path 130.

The CA public key storage unit 122 stores the CA public key KCP for verifying the public key certificate CP included in the signature data set SS.

The signature data set storage unit 123 stores the signature data set SS received by the reception unit 121.

The signature verification unit 124 verifies the signature data S included in the signature data set SS as well as the signature data SP included in the public key certificate CP.

Figure 7:
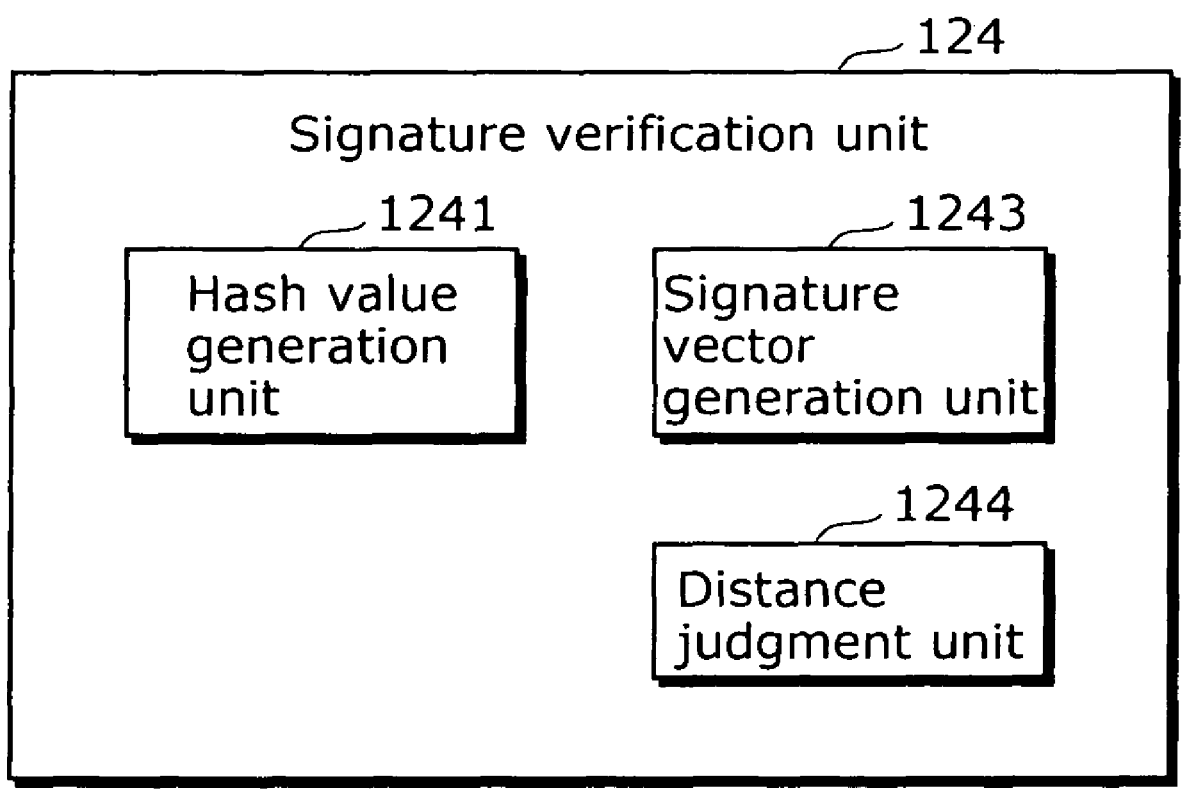
FIG. 7 is a block diagram showing a configuration of a signature verification unit according to the first embodiment of the present invention.

FIG. 7 is a block diagram showing a configuration of the signature verification unit124 according to the present embodiment.

The signature verification unit 124 includes a hash value generation unit 1241, a signature vector generation unit 1243 and a distance judgment unit 1244.

The signature verification unit 124 includes a hash value generation unit 1241, a signature vector generation unit 1243 and a distance judgment unit 1244.

The hash value generation unit 1241 calculates the respective hash values H (=(m1, m2)) of the public key KP and the message m which is data for which a signature is to be generated.

The signature vector generation unit 1243 calculates the polynomials s and t for the respective signature data S and signature data SP. In other words, the signature vector generation unit 1243 calculates the polynomial s by substituting the polynomials sl and sh indicated by the signature data into the expression s=sl+sh×q. In addition, the signature vector generation unit 1243 calculates the polynomial tl by substituting the polynomial sl indicated by the signature data and the polynomial h (a polynomial indicated by the public key KP or the public key KPC) into the expression (Expression 6) described above, as well as calculates the polynomial t by substituting the polynomial tl and the polynomial th that is indicated by the signature data into the expression t=tl+th×q.

Thus, the signature vector generation unit 1243 generates, as the signature vector SV, the 2·N-degree vector (s, t) for the respective signature data S and signature data SP.

The distance judgment unit 1244 calculates a distance between the hash value H and the signature vector SV for the message m and the signature data S as well as for the public key KP and the signature data SP, and judges whether or not the distance is smaller than Normbound. In other words, in the case where the distance between the hash value and the signature vector SV for the message m and the signature data S is smaller than Normbound, the distance judgment unit 1244 judges that the signature data S is authorized and accepts the signature data S. On the other hand, in the case where the distance is equal to or greater than Normbound, the distance judgment unit 1244 judges that the signature data S is unauthorized and denies the signature data S. Also, in the case where the distance between the hash value and the signature vector SV with respect to the public key KP and the signature data SP is smaller than Normbound, the distance judgment unit 1244 judges that the signature data SP is authorized and accepts the signature data SP. On the other hand, in the case where the distance is equal to or greater than Normbound, the distance judgment unit 1244 judges that the signature data SP is unauthorized and denies the signature data SP.

Figure 8:
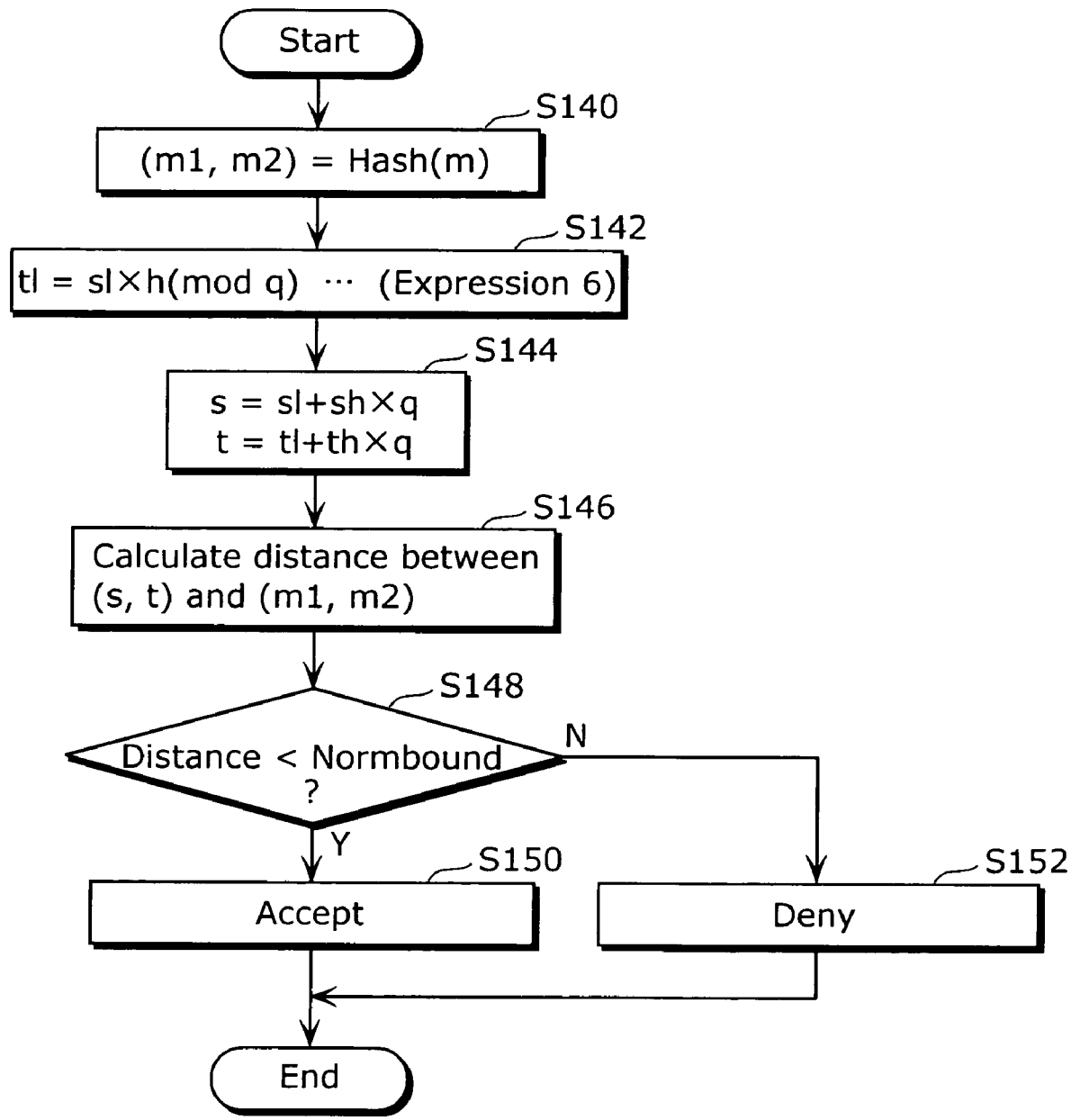
FIG. 8 is a flowchart showing an operation of the signature verification unit according to the first embodiment of the present invention.

FIG. 8 is a flowchart showing an operation of the signature verification unit 124.

The signature verification unit 124 verifies the signature data S by carrying out the operation shown in FIG. 8 for the message m and the signature data S, using the public key KP.

Note that the signature verification unit 124 verifies the signature data SP by performing the operation shown in FIG. 8 for the public key KP and the signature data SP, using the public key KCP before the verification of the signature data S.

The following describes a detailed operation for verifying the signature data S with reference to FIG. 8.

First, the hash value generation unit 1241 of the signature verification unit 124 calculates a hash value H (=(m1, m2)) of the message m corresponding to the signature data S (Step S140).

Next, the signature vector generation unit 1243 calculates the polynomial tl by substituting, into the expression (Expression 6) indicated above, the polynomial sl indicated by the signature data S and the polynomial h indicated by the public key KP (Step S142).

In addition, the signature vector generation unit 1243 calculates the polynomials s and t by substituting the polynomials sl, sh and th indicated by the signature data S and the polynomial tl calculated in Step S142 into the expressions s=sl+sh×q and t=tl+th×q (Step S144). Here, the signature vector generation unit 1243 generates 2·N-degree vector as the signature vector SV for the signature data S.

The distance judgment unit 1244 calculates a distance between the hash value H (=(m1, m2)) calculated in Step S140 and the signature vector SV generated in Step S144 (Step S146). Then, the distance judgment unit 1244 judges whether or not the distance is smaller than Normbound (Step S148). In the case of judging that the distance is smaller than Normbound (Y in Step S148), the distance judgment unit 1244 judges that the signature data S is authorized and accepts the signature data S (Step S150). On the other hand, in the case of judging that the distance is not smaller than Normbound (N in Step S148), the distance judgment unit 1244 judges that the signature data S is unauthorized and denies the signature data S (Step S152).

Figure 9:
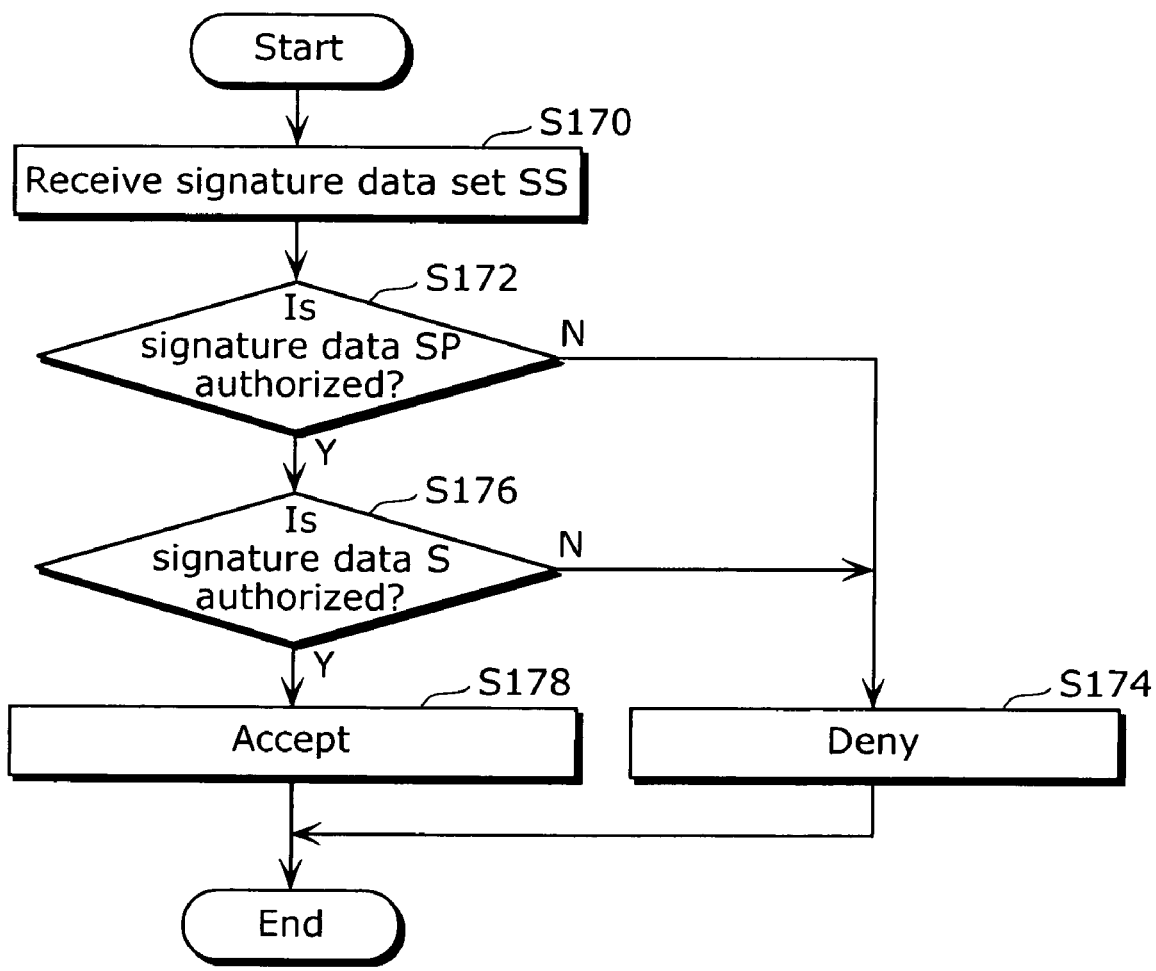
FIG. 9 is a flowchart showing an overall operation of the signature verification apparatus according to the first embodiment of the present invention.

FIG. 9 is a flowchart showing an overall operation of the signature verification apparatus 120.

First, the reception unit 121 of the signature verification apparatus 120 receives the signature data set SS from the signature generation apparatus 110 via the communication path 130, and stores the signature data set SS in the signature data set storage unit 123 (Step S170).

The signature verification unit 124 verifies, for the public key KP and the signature data SP included in the public key certificate CP within the signature data set SS, whether or not the signature data SP is an authorized signature of the public key KP, using the CA public key KCP stored in the CA public key storage unit 122. In other words, the signature verification unit 124 judges whether or not the signature data SP is an authorized signature (Step S172). Here, in the case of judging that the signature data SP is not authorized, the signature verification unit 124 denies the signature data SP (Step S174).

On the other hand, in the case of judging that the signature data SP is an authorized signature (Y in Step S 172), the signature verification unit 124 accepts the signature data SP. In addition, the signature verification unit 124 verifies, for the message m and the signature data S included in the signature data set SS, whether or not the signature data S is an authorized signature of the message m, using the public key KP. In other words, the signature verification unit 124 judges whether or not the signature data S is an authorized signature (Step S176).

Here, in the case of judging that the signature data S is not authorized (N in Step S176), the signature verification unit 124 denies the signature data S (Step S174), whereas in the case of judging that the signature data S is authorized (Y in Step S176), accepts the signature data S (Step S178). That is to say, in Step S178, the signature verification unit 124 recognizes that the signature data set SS is data provided with an authorized signature.

Thus, in the present embodiment, when a public key is used by the signature generation apparatus 110, the polynomials sl, sh and th by which the signature vector (s, t) can be decrypted are included in the signature data. Therefore, the signature verification apparatus 120, having obtained such signature data and message, can properly decrypt the signature vector (s, t) based on the signature data, and perform signature verification using the signature vector (s, t). For example, the signature verification apparatus 120 can properly decrypt the polynomial s which is a part of the signature vector, by multiplying, with q, the polynomial sh included in the signature data and adding the polynomial sl to the result of the multiplication. In addition, the signature verification apparatus 120 can properly decrypt the polynomial t which is a part of the signature vector, by adding a product of the polynomial th and q to a remainder, modulo q, of a product of the polynomial sl included in the signature data and the public key (polynomial h). Thus, with the present invention, signature data by which the signature verification apparatus 120 can properly decrypt the signature vector (s, t) is generated without performing (mod q) operation on the signature vector (s, t). Therefore, it is possible to prevent the lack of information due to the (mod q) operation and to surely prevent the occurrence of inappropriate signature verification error as caused in the conventional examples. Consequently, even in the case where a difference between the largest value and the smallest value of each of the elements in the signature vector (s, t) exceeds q, it is possible to properly decrypt the signature vector (s, t) in the verification of the signature.

Second Embodiment

The improved NTRUSign signature scheme 2 according to the second embodiment of the present invention is an improved version of the conventional NTRUSign signature scheme, for generating a signature in such a manner that the occurrence of inappropriate signature verification error can be prevented, and verifying the generated signature, as in the case of the first embodiment. Moreover, compared with the first embodiment, the improved NTRUSign signature scheme 2 according to the present invention allows reduction in the information amount of the signature data.

The following describes in detail the improved NTRUSign signature scheme 2 according to the present embodiment <Improved NTRUSign signature scheme 2>

(1) Parameters in the Improved NTRUSign Signature Scheme 2

In the improved NTRUSign signature scheme 2, the non-negative integer parameters such as N, q, df, dg and Normbound are used. The definitions of these parameters are as same as those given by the conventional NTRUSign signature scheme. The following describes the meanings of these parameters.

(i) Parameter N

The improved NTRUSign signature scheme 2 is a digital signature scheme which performs signature generation and signature verification using polynomial operations. The degree of polynomials used in the improved NTRUSign signature scheme 2 is determined by the parameter N described above.

The polynomials used in the improved NTRUSign signature scheme 2 are integer coefficient polynomials of degree N−1 or lower with respect to the parameter N, for example, $X^4+X^3+1$ when N=5. Here, "$X^a$" shall denote the "a th" power of X. A public key h and a polynomial s which is a part of the signature vector are both expressed as polynomials of degree N−1 or lower. A private key is a set of four polynomials (f, g, F, G) of degree (N−1) or lower. In other words, f, g, F and G are all polynomials of degree N−1 or lower. Note that, hereinafter, a set of (f, g, F, G) made up of four polynomials may be represented as {(f, g), (F, G)}, in some cases, regarding the set to be made up of two pairs of (f, g) and (F, G).

A polynomial operation is computed so that the computation always results in a polynomial of degree (N−1) or lower, using the relational expression $X^N=1$ with respect to the parameter N. For example, assuming that "x" presents a product of a polynomial and a polynomial, and "·" presents a product of an integer and a polynomial (or a product of an integer and an integer), when N=5, a product of the polynomial $X^4+X^2+1$ and the polynomial $X^3+X$ is operated so as to result in a polynomial of degree N−1 or lower, as indicated below, based on the expression $X^5=1$.

$$(X^4+X^2+1) \times (X^3+X) = X^7 + 2 \cdot X^5 + 2 \cdot X^3 + X$$

$$= X^2 \cdot 1 + 2 \cdot 1 + 2 \cdot X^3 + X$$

$$= 2 \cdot X^3 + X^2 + X + 2$$

Note that, in the NTRUSign signature scheme, a polynomial a of degree (N−1) expressed as $a = a\_0 + a\_1 \cdot X + a\_2 \cdot X^2 + \ldots + a\_(N-1) \cdot X^{(N-1)}$ is identified as a vector (a_0, a_1, a_2, ..., a_(N−1)). Here, a_0, a_1, a_2, ..., a_(N−1) are coefficients of the polynomial a, and are integer numbers.

(ii) Parameter q

In the improved NTRUSign signature scheme 2, a parameter q which is an integer number of 2 or greater is used. The coefficients in a polynomial that appears in the improved NTRUSign signature scheme 2 obtain a remainder modulo q.

(iii) Parameters df and dg

The method for selecting a polynomial f which is a part of the private key used in the improved NTRUSign signature scheme 2 as well as a polynomial g to be used together with the polynomial f for generating a public key polynomial h is determined based on the parameters df and dg.

First, the polynomial f is selected so that df coefficients indicate "1" and other coefficients indicate "0". In other words, the polynomial f is a polynomial of degree (N−1) or lower, having N coefficients that range from coefficients of degree 0 (constant term) to degree (N−1), and the polynomial f is selected so that df coefficients indicate 1, and (N-df) coefficients indicate 0 out of such N coefficients. Then, the polynomial g is selected so that dg coefficients indicate "1", and other coefficients indicate "0".

(iv) Parameter Normbound

In the improved NTRUSign signature scheme 2, a distance between a 2·N-degree vector created from the signature s, and a 2·N-degree vector which is a hash value of message data (hereinafter simply referred to as "message") is calculated, and whether or not the signature is authorized is judged based on the distance. Normbound is a threshold value to be used for the judgment. That is to say, in the case where the distance is smaller than Normbound, the signature is accepted as authorized, while in the case where the distance equals to or greater than Normbound, the signature is denied as an unauthorized signature. Note that the Non-Patent Reference 4 shows an example of (N, q, df, dg, Normbound)=(251, 128, 73, 71, 310) as an example of the parameters in the NTRUSign signature scheme. In the improved NTRUSign signature scheme 2, the same parameters as shown in the above-mentioned example may be used.

(2) Hash Value of Message and a Distance between Norm and Vector

In the improved NTRUSign signature scheme 2, a signature is created for a hash value of a message. The hash value of a message is a pair of polynomials of degree N, and is identified as a 2·N-degree vector. Note that the Non-Patent Reference 1 describes in detail hash function for deriving a hash value based on a message.

In the improved NTRUSign signature scheme 2, a distance between vectors is used for signature verification, and a norm (Centered norm) is used for the calculation of such a distance, as in the conventional NTRUSign signature scheme. The following defines a distance between a norm and a vector.

A norm $\|a\|$ of the polynomial $a = a\_0 + a\_1 \cdot X + a\_2 \cdot X^2 + \ldots + a\_(N-1) \cdot X^(N-1)$ is defined as below.

$$\|a\| = sqrt((a\_0-\mu)^2 + (a\_1-\mu)^2 + \ldots + (a\_(N-1)-\mu)^2)$$

$$\mu = (1/N) \cdot (a\_0 + a\_1 + a\_2 + \ldots + a\_(N-1))$$

Here, sqrt (x) denotes square root of x.

A norm $\|(a, b)\|$ of the pair (a, b) of the polynomials a and b is defined as indicated below.

$$\|(a,b)\| = sqrt(\|a\|^2 + \|b\|^2)$$

A distance (inter-vector distance) between the pair (a, b) of the polynomials a and b and the pair (c, d) of the polynomials c and d is defined as $\|(c-a, d-b)\|$.

(3) Key Generation in the Improved NTRUSign Signature Scheme 2

In the improved NTRUSign signature scheme 2, key generation is performed using the same method as used in the NTRUSign signature scheme. As described above, in the second variation NTRU cryptosystem, the polynomials f and g are generated at random using the parameters df and dg. As is described in Non-Patent Reference 4, the polynomial h is generated by the expression $h = p \cdot Fq \times g \pmod{q}$ using the polynomial Fq which satisfies $Fq \times f = 1 \pmod{q}$. The polynomial h is generated by $h = Fq \times g \pmod{q}$. Moreover, the polynomials F and G with small norms that satisfy the following expression is derived.

$$f \times G - g \times F = q$$

Here, it is assumed that $\{(f, g), (F, G)\}$ denotes a private key and h denotes a public key. The private key is a key for generating a signature and is also called a signature generation key. The public key is a key for verifying a signature and is also called a signature verification key.

Here, $x = y \pmod q$ is an operation which obtains, as the coefficient of "i th" degree in the polynomial x, a remainder obtained when the coefficient of "i th" degree in the polynomial y is divided by modulo q so that the remainder indicates a value ranging from "0" to "(q−1)" ($0 \leq i \leq N-1$). That is to say that it is an operation which obtains, as the polynomial x, a polynomial to which the mod q operation is performed so that each of the coefficients in the polynomial y indicates a value ranging from "0" to "(q−1)".

(4) Signature Generation in the Improved NTRUSign Signature Scheme 2

In the signature generation according to the improved NTRUSign signature scheme 2, sl' and th' which represent a signature of a message m for which a signature should be generated are calculated.

First, a 2·N-degree vector (m1, m2) (m1 and m2 are polynomials of degree N) which is a hash value for the message m is calculated.

The polynomials a, b, A and B are calculated so as to satisfy the following expressions (Expression 11) and (Expression 12) using the 2·N-degree vector (m1, m2) and the private key $\{(f, g), (F, G)\}$.

$$G \times m1 - F \times m2 = A + q \times B \quad \text{(Expression 11)}$$

$$-g \times m1 + f \times m2 = a + q \times b \quad \text{(Expression 12)}$$

Here, it is presumed that each of the coefficients in the polynomials A and a is a remainder obtained when divided by q so that the remainder indicates a value ranging from "<−q/2>+1" to "<q/2>". In other words, in the case where the remainder obtained when divided by q indicates a value ranging from "<q/2>" to "q−1", the remainder is adjusted through the subtraction of q so as to fall within the above-mentioned range. Here, <x> indicates the largest value within the values indicating x or lower. For example, $<-½> = -1$.

The polynomials s and t are calculated using the following expressions (Expression 13) and (Expression 14).

$$s = f \times B + F \times b \pmod q$$

$$t = g \times B + G \times b \pmod q$$

Here, in the present embodiment, polynomials s' and t' are calculated so as to satisfy $s = sl + sh \times q$ and $t = tl + th \times q$ without obtaining a remainder modulo q with respect to the polynomials s' and t'.

That is to say that the polynomial s is defined as $s = s\_0 + s\_1 \cdot X + s\_2 \cdot X^s + \ldots + s\_(N-1) \cdot X^(N-1)$, the polynomial t is defined as $t = t\_0 + t\_1 \cdot X + t\_2 \cdot X^2 + \ldots + t\_(N-1) \cdot X^(N-1)$, and a polynomial v0 is a polynomial whose coefficients are all 1. In this case, the polynomials s' and t' are calculated using the following expressions (Expression 15) and (Expression 16).

$$\begin{aligned} s' &= s - (s\_0 - m1\_0) \times v0 \\ &= m1\_0 + (s\_1 - s\_0 + m1\_0) \cdot X + \\ &\quad (s\_2 - s\_0 + m1\_0) \cdot X^2 + \ldots + \\ &\quad (s\_(N-1) - 2\_0 + m1\_0) \cdot X^(N-1) \end{aligned} \quad \text{(Expression 15)}$$

$$\begin{aligned} t' &= t - (hs \times (s\_0 - m1\_0) \bmod q) \times v0 \\ &= (t\_0 - (hs \times (s\_0 - m1\_0) \bmod q)) \\ &\quad + (t\_1 - (hs \times (s\_0 - m1\_0) \bmod q)) \cdot X + \\ &\quad (t\_2 - (hs \times (s\_0 - m1\_0) \bmod q)) \cdot X^2 + \ldots + \\ &\quad (t\_(N-1) - (hs \times (s\_0 - m1\_0) \bmod q)) \cdot \\ &\quad X^(N-1) \end{aligned} \quad \text{(Expression 16)}$$

Note that in the expressions (Expression 15) and (Expression 16), m1__0 denotes a coefficient of 0th term (first term) of the polynomial m1, while hs denotes a sum of all the coefficients in the public key polynomial h.

Moreover, polynomials sl' and th' are calculated so as to satisfy $s' - m1 = sl'$ and $t' = tl' + th' \times q$. Here, all the coefficients (elements) in the polynomial tl' are non-negative integer numbers of q or smaller. In the present embodiment, the polynomials sl' and th' are regarded to represent a signature.

That is to say that, in the present embodiment, since a distance between the polynomial s' and the polynomial m1 is close, it is possible to reduce the information amount of the polynomial sl' that is to form a signature.

Also, in the present embodiment, the polynomial s' is calculated so that the first element of the polynomial s' equals to the first element of the polynomial m1, through addition or subtraction of a vector having a norm of 0. Therefore, the first element of the polynomial sl' that is to become a signature becomes 0, and a value of each of the other elements can me made closer to 0, so that it is possible to further reduce the information amount of the polynomial sl', namely, the information amount of the signature data. Also, the value of the first element of the polynomial s' is adjusted through addition or subtraction of a vector having a norm of 0. Therefore, the adjustment can be made without changing the norm of the polynomial s once calculated, and the distance between (s, t) and (m1, m2) as well as the distance between (s', t') and (m1, m2) can be maintained for the adjustment.

(5) Signature Verification in the Improved NTRUSign Signature Scheme 2

First, a 2·N-degree vector (m1, m2), which is a hash value for a message m is calculated. Then, the polynomial s' is calculated using s'=sl'+m1. The polynomial tl' is then calculated by the following expression (Expression 17) using the public key h.

$$tl' = s' \times h \pmod{q} \quad \text{(Expression 17)}$$

Also, the polynomial t' is calculated by substituting the polynomial th' which is a signature and tl' calculated by the expression (Expression 17) into t'=tl'+th'×q.

A distance between the 2·N-degree vectors (s', t') and (m1, m2) is obtained, and whether or not the distance is smaller than Normbound is checked. In the case where the distance is smaller than Normbound, the signature s is judged to be authorized and then accepted. In the case where the distance is equal to or greater than Normbound, the signature s is judged to be unauthorized and then denied.

First, that the distance between (s, t) and (m1, m2) equals to the distance between (s', t') and (m1, m2) is shown. With the expression (Expression 15), a relationship presented by s−s'= (s_0−m1_0)×v0 is established, and with the expression (Expression 16), a relationship presented by t−t'=(hs×(s_0−m1_0 mod q)×v0 is established. Therefore, the relationships expressed by ||s−s'''||=(s_0−m1_0)·||v0|| and ||t−t'||=(hs×(s_0−m1_0) mod q)·||v0|| are established. Here, ||v0||=0, derives ||s−s'||=0 and, ||t−t'||=0 as well as ||m1−s||=||m1−s'|| and ||m2−t'||=||m2−t'||. Therefore, the distance between (s, t) and (m1, m2) is identical to the distance between (s', t') and (m1, m2).

The following shows that s'×h (mod q) becomes tr. With s'=s−(s_0−m1_0)×v0, the relationship presented in the following expression is established.

$$s' \times h = s \times h - (s\_0 - m1\_0) \times v0 \times h$$

Here, the coefficients in the polynomial v0 all indicate 1 so that v0×h=hs+hs·X+hs·X^2+ . . . +hs·X^(N−1) mod X^N−1 is derived.

Therefore, the relationship presented in the following expression is established.

$$s' \times h = s \times h - (s\_0 - m1\_0) \times (hs, hs, \ldots, hs)$$
$$= t - (hs \times (s\_0 - m1\_0)) \times v0 \bmod q$$
$$= t' \bmod q$$
$$= tl'$$

As a result, the polynomial t' is calculated using the expression (Expression 16) indicated above, and by signing for the polynomial th' which satisfies t'=tl'+th'×q together with the polynomial sl' in advance, it is possible to calculate the 2·N-degree vector (s', t') based on the expression (Expression 17) indicated above, s'=sl'+m1 and t'=tl'+th'×q. Then, since the distance between (s, t) and (m1, m2) equals to the distance between (s', t') and (m1, m2), it is possible to correctly verify the signature based on the distance between (s', t') and (m1, m2).

Figure 10:
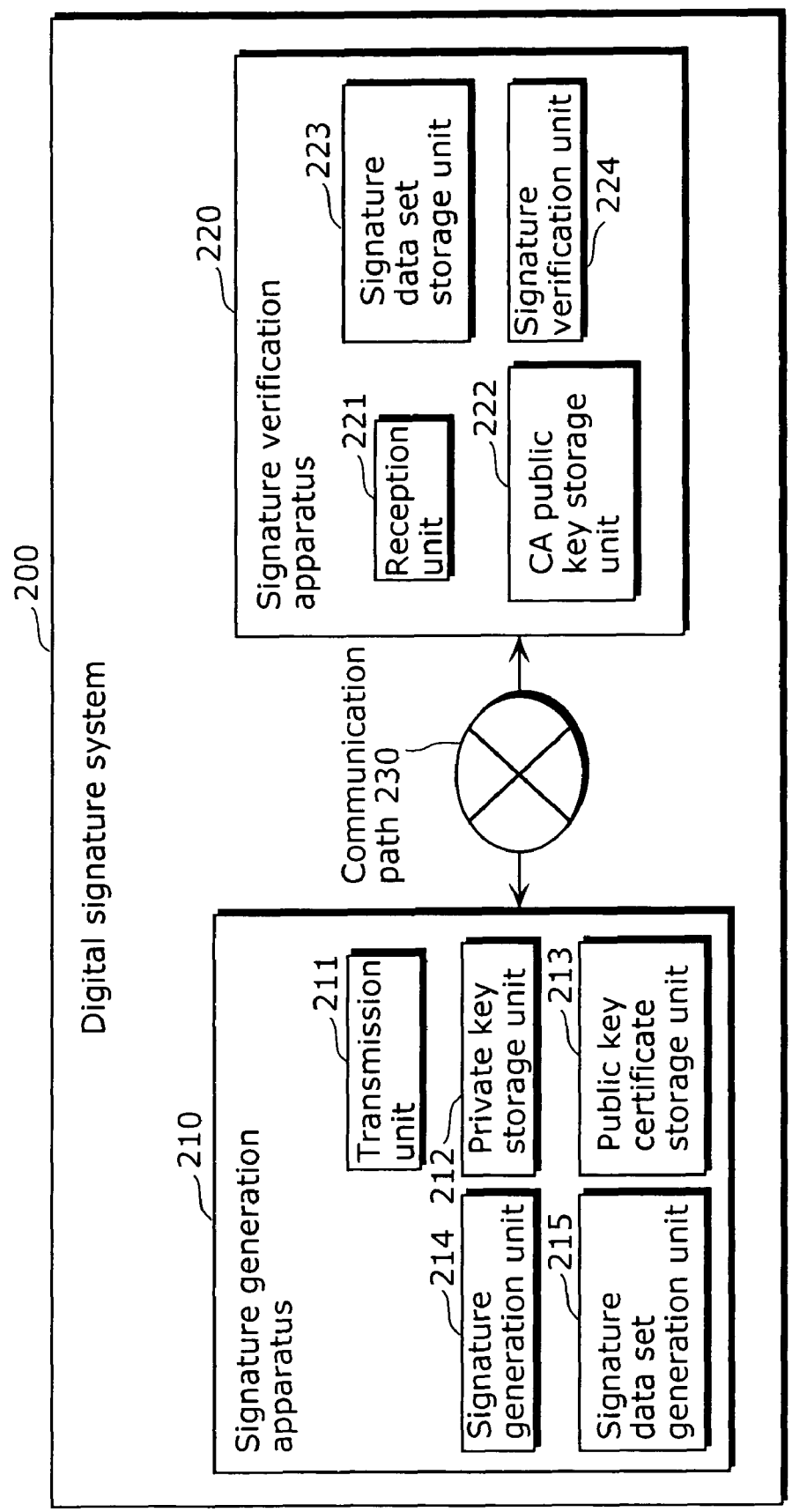
FIG. 10 is a block diagram showing a configuration of digital signature system according to a second embodiment of the present invention.

FIG. 10 is a block diagram which shows a configuration of a digital signature system 200 according to the present embodiment.

The digital signature system 200 generates a signature using the above-mentioned improved NTRUSign signature scheme 2, and verifies the generated signature. Such a digital signature system 200 is comprised of a signature generation apparatus 210, a signature verification apparatus 220, and a communication path 230.

The signature generation apparatus 210 generates, based on the improved NTRUSign signature scheme 2, a signature data set SS which includes signature data S (data indicating the polynomials sl, and th') for an inputted message m, and transmits the signature data set SS to the signature verification apparatus 220 via the communication path 230. Such a signature generation apparatus 210 also includes a transmission unit 211, a private key storage unit 212, a public key certificate storage unit 213, a signature generation unit 214 and a signature data set generation unit 215.

The signature verification apparatus 220 receives the signature data set SS from the signature generation apparatus 210 via the communication path 230, and verifies the signature data S included in the signature data set SS, based on the improved NTRUSign signature scheme 2. Such a signature verification apparatus 220 also includes a reception unit 221, a CA public key storage unit 222, a signature data set storage unit 223, and a signature verification unit 224.

The following describes in detail the signature generation apparatus 210 according to the present embodiment.

The transmission unit 211 of the signature generation apparatus 210 transmits the signature data set SS to the signature verification apparatus 220 via the communication path 230.

The private key storage unit 212 stores a private key KS for generating the polynomial s for the message m. The private key KS shall be previously provided.

The public key certificate storage unit 213 stores a public key certificate CP of the public key KP (public key h) indicated by the polynomial h as indicated above. The public key certificate CP is made up of a public key KP, signature data SP of a public key KP issued by Certificate Authority. The signature data SP is also generated using the improved NTRUSign signature scheme 2. The public key certificate CP shall be previously provided. Note that the public key certificate CP may include data other than the public key KP and the signature data SP. For example, the public key certificate CP may include a user identifier and validity of the public key certificate CP.

The signature generation unit 214 generates the polynomials and t for the message m using the private key KS stored in the private key storage unit 212, and further generates signature data S (polynomials sl' and th') for verifying the polynomials s' and t', which are equivalent to the polynomials s and t, by decrypting them.

Figure 11:
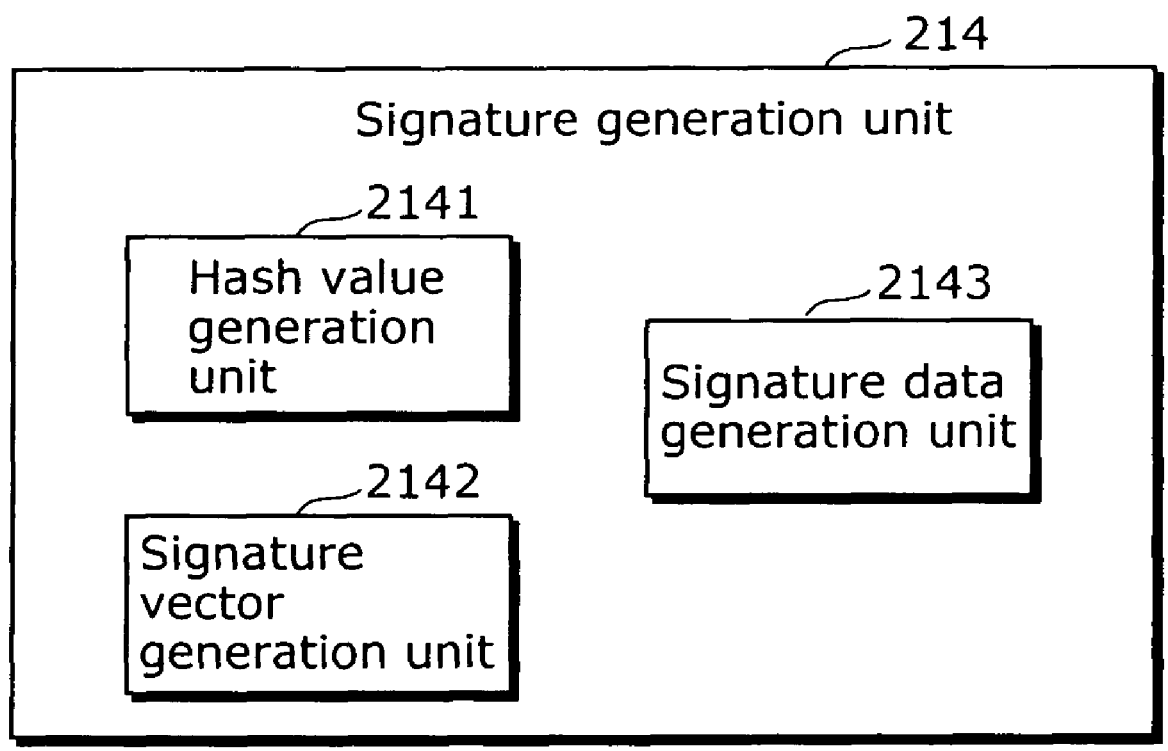
FIG. 11 is a block diagram showing a signature generation unit according to the second embodiment of the present invention.

FIG. 11 is a block diagram showing a configuration of the signature generation unit 214 according to the present embodiment.

The signature generation unit 214 includes a hash value generation unit 2141, a signature vector generation unit 2142, and a signature data generation unit 2143.

The hash value generation unit 2141 calculates a 2·N-degree vector (m1, m2) (m1 and m2 are polynomials of N-degree), indicating a hash value for the message m.

The signature vector generation unit 2142 generates the polynomials s and t by the above-mentioned expressions (Expression 1) through (Expression 14), using the private key KS and the hash value H. In addition, unlike the signature vector generation unit 1142 of the first embodiment, the signature vector generation unit 2142 according to the present embodiment calculates the polynomials s' and t' by the expressions (Expression 15) and (Expression 16) using the generated polynomials s and t. In other words, the signature vector generation unit 2142 calculates a signature vector (s, t) indicating a nearest-neighbor lattice point P of the hash value H (m)=(m1, m2) for the message m on a 2·N degree lattice extended by a private key sequence {(f, g), (F, G)}.

The signature data generation unit 2143 calculates the polynomials sl' and th' so as to satisfy s'−m1=sl' and t'=tl'+th'×q, using the polynomials s' and t' calculated by the signature vector generation unit 2142, and generates the signature data S indicating the polynomials sl' and th'.

Figure 12:
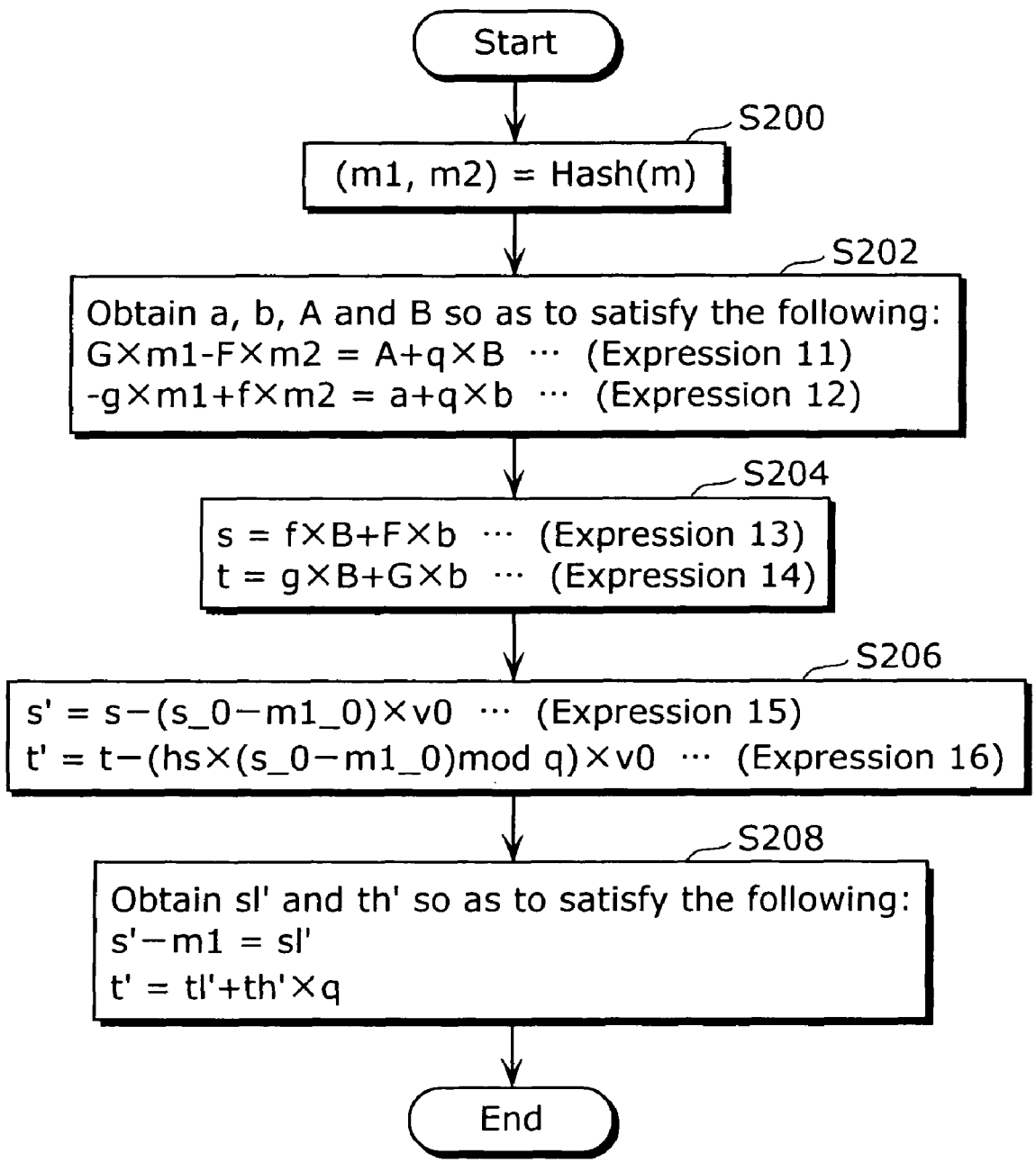
FIG. 12 is a flowchart showing an operation of the signature generation unit according to the second embodiment of the present invention.

FIG. 12 is a flowchart showing an operation of the signature generation unit 214.

First, the hash value generation unit 2141 of the signature generation unit 214 calculates the 2·N-degree vector (m1, m2) indicating the hash value H for the message m (Step S200).

Next, the signature vector generation unit 2142 of the signature generation unit 214 calculates the polynomials a, b, A and B so as to satisfy the expressions (Expression 11) and (Expression 12) indicated above (Step S202). In addition, the signature vector generation unit 2142 calculates the polynomials s and t using the expressions (Expression 3) and (Expression 4) indicated above (Step S204). Then, the signature vector generation unit 2142 calculates the polynomials s' and t' by the expressions (Expression 15) and (Expression 16) using the polynomials s and t. (Step S206).

Then, the signature data generation unit 2143 of the signature generation unit 214 calculates the polynomials sl' and th' so as to satisfy s'−m1=sl' and t'=tl'+th'×q, and generates the signature data S indicating the polynomials sl' and th' (Step S208).

Here, an overall operation of the signature generation apparatus 210 according to the present embodiment is described with reference to the flowchart shown in FIG. 6 of the first embodiment.

The signature generation unit 214 of the signature generation apparatus 210 generates the polynomials s and t for the message m, using the private key KS stored in the private key storage unit 212, as well as generates the signature data S (data indicating the polynomials sl' and th') based on the polynomials s and t (Step S120).

Next, the signature data set generation unit 215 of the signature generation apparatus 210 generates signature data set SS made up of a message m, signature data S and the public key certificate CP stored in the public key certificate storage unit 213 (S step 122).

Then, the transmission unit 211 of the signature generation apparatus 210 transmits the signature data set SS to the signature verification apparatus 220 via the communication path 230 (Step S 124).

The following describes in detail the signature verification apparatus 220 according to the present embodiment.

The reception unit 221 of the signature verification apparatus 220 receives the signature data set SS transmitted from the signature generation apparatus 210 via the communication path 230.

The CA public key storage unit 222 stores the CA public key KCP for verifying the public key certificate CP included in the signature data set SS.

The signature data set storage unit 223 stores the signature data set SS received by the reception unit 221.

The signature verification unit 224 verifies the signature data S included in the signature data set SS as well as the signature data SP included in the public key certificate CP.

Figure 13:
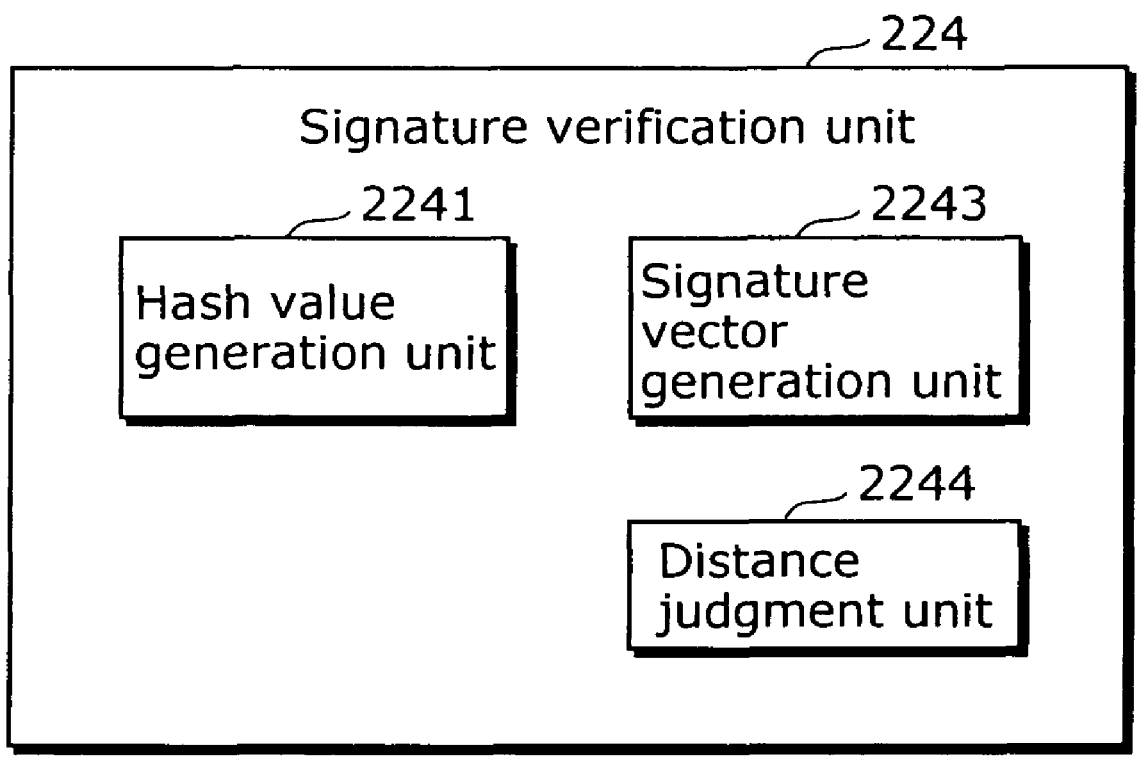
FIG. 13 is a block diagram showing a configuration of a signature verification unit according to the second embodiment of the present invention.

FIG. 13 is a block diagram showing a configuration of the signature verification unit 224 according to the present embodiment.

The signature verification unit 224 includes a hash value generation unit 2241, a signature vector generation unit 2243 and a distance judgment unit 2244.

The hash value generation unit 2241 calculates the respective hash values H (=(m1, m2)) of the public key KP and the message m which is data for which a signature is to be generated.

The signature vector generation unit 2243, unlike the signature vector generation unit 1243, calculates the polynomials s' and t' for the respective signature data S and signature data SP. In other words, the signature vector generation unit 2243 calculates the polynomial s' by substituting the polynomials sl' indicated by the signature data into the expression s'=sl'−m1. In addition, the signature vector generation unit 2243 calculates the polynomial tl' by substituting the polynomial s' and h (public key KP or public key KCP) into the expression (Expression 17) indicated above. Then, the signature vector generation unit 2243 calculates the polynomial t' by substituting the polynomial th' and the polynomial tl' which are indicated by the signature data into the expression t'=tl'+th'×q.

Thus, the signature vector generation unit 2243 generates, as the signature vector SV, the 2·N-degree vector (s', t') for the respective signature data S and signature data SP.

The distance judgment unit 2244 calculates a distance between a hash value H and a signature vector SV for the message m and the signature data S as well as for the public key KP and the signature data SP, and judges whether or not the distance is smaller than Normbound. In other words, in the case where the distance between the hash value and the signature vector SV for the message m and the signature data S is smaller than Normbound, the distance judgment unit 2244 judges that the signature data S is authorized and accepts the signature data S. On the other hand, in the case where the distance is equal to or greater than Normbound, the distance judgment unit 2244 judges that the signature data S is unauthorized and denies the signature data S. Also, in the case where the distance between the hash value and the signature vector SV with respect to the public key KP and the signature data SP is smaller than Normbound, the distance judgment unit 2244 judges that the signature data SP is authorized and accepts the signature data SP. On the other hand, in the case where the distance is equal to or greater than Normbound, the distance judgment unit 2244 judges that the signature data SP is unauthorized and denies the signature data SP.

FIG. 14 is a flowchart showing an operation of the signature verification unit 224.

The signature verification unit 224 verifies the signature data S by carrying out the operation shown in FIG. 14 for the message m and the signature data S, using the public key KP. Note that the signature verification unit 224 verifies the signature data SP by performing the operation shown in FIG. 14 for the public key KP and the signature data SP, using the public key KCP before the verification of the signature data S.

The following describes a detailed operation performed by the signature verification unit 224 for verifying the signature data S with reference to FIG. 14.

First, the hash value generation unit 2241 of the signature verification unit 224 calculates a hash value H (=(m1, m2)) of the message m corresponding to the signature data S (Step S240).

Then, the signature vector generation unit 2243 calculates the polynomial s' by substituting the polynomials sl' indicated by the signature data S into the expression s'=sl'+m1 (Step S242). In addition, the signature vector generation unit 2243 calculates the polynomial tl' by substituting, into the expression (Expression 17) indicated above, the calculated polynomial s' and the polynomial h indicated by the public key KP (Step S244). Then, the signature vector generation unit 2243 calculates the polynomial t' by substituting the polynomials th' and tl' indicated by the signature data S into the expression t'=tl'+th'×q (Step S246). Here, the signature vector generation unit 2243 generates 2·N-degree vector (s', t') as the signature vector SV for the signature data S.

The distance judgment unit 2244 calculates a distance between the hash value H (=(m1, m2)) calculated in Step S240 and the signature vector SV generated in Step S246 (Step S248). Then, the distance judgment unit 2244 judges whether or not the distance is smaller than Normbound (Step S250). In the case of judging that the distance is smaller than Normbound (Y in Step S250), the distance judgment unit 2244 judges that the signature data S is authorized and accepts the signature data S (Step S252). On the other hand, in the case of judging that the distance is not smaller than Normbound (N in Step S250), the distance judgment unit 2244 judges that the signature data S is unauthorized and denies the signature data S (Step S254).

The signature verification apparatus 220 according to the present embodiment will be described with reference to the flowchart shown in FIG. 9 of the first embodiment.

First, the reception unit 221 of the signature verification apparatus 220 receives the signature data set SS from the signature generation apparatus 210 via the communication path 230, and stores the signature data set SS in the signature data set storage unit 223 (Step S170).

The signature verification unit 224 verifies, for the public key KP and the signature data SP included in the public key certificate CP within the signature data set SS, whether or not the signature data SP is an authorized signature of the public key KP, using the CA public key KCP stored in the CA public key storage unit 222. In other words, the signature verification unit 224 judges whether or not the signature data SP is an authorized signature (Step S172). Here, in the case of judging that the signature data SP is not an authorized signature (N in Step S172), the signature verification unit 224 denies the signature data SP (Step S174).

On the other hand, in the case of judging that the signature data SP is an authorized signature (Y in Step S172), the signature verification unit 224 accepts the signature data SP. In addition, the signature verification unit 224 verifies, for the message m and the signature data S included in the signature data set SS, whether or not the signature data S is an authorized signature of the message m, using the public key KP. In other words, the signature verification unit 224 judges whether or not the signature data S is an authorized signature (Step S176).

Here, in the case of judging that the signature data S is not an authorized signature (N in Step S176), the signature verification unit 224 denies the signature data S (Step S174), whereas in the case of judging that the signature data S is an authorized signature (Y in Step S176), accepts the signature data S (Step S178). That is to say, in Step S178, the signature verification unit 224 recognizes that the signature data set SS is data provided with an authorized signature.

Thus, in the present embodiment, when a public key is used by the signature generation apparatus 210, the polynomials sl'=s'−m1 and th' by which the signature vector (s', t') can be decrypted are included in the signature data. Therefore, the signature verification apparatus 220, having obtained such signature data and message, can properly decrypt the signature vector (s', t') based on the signature data, and perform signature verification using the signature vector (s', t'). For example, the signature verification apparatus 220 generates a hash value (m1, m2) by applying hash function to the message m, and can correctly decrypt the polynomial sl' by adding the polynomial m1 to the polynomial s'. In addition, the signature verification apparatus 220 can properly decrypt the polynomial t' which is a part of the signature vector, by adding a product of the polynomial th' and q to a remainder, modulo q, of a product of the polynomial s' and the public key (polynomial h). Thus, with the present invention, signature data by which the signature verification apparatus 220 can properly decrypt the signature vector (s', t') is generated without performing (mod q) operation on the signature vector (s', t'). Therefore, it is possible to prevent the lack of information due to the (mod q) operation and thus, to surely prevent the occurrence of inappropriate signature verification error as caused in the conventional examples. Consequently, even in the case where a difference between the largest value and the smallest value of each of the elements in the signature vector (s', t') exceeds q, it is possible to properly decrypt the signature vector (s', t') in the verification of the signature.

In the present embodiment, a difference (polynomial sl') between the polynomial s' and the polynomial m1 is transmitted as the signature data. Since the distance between the polynomial s' and the polynomial m1 is short, and also, the first element of the polynomial s' equals to the first element of the polynomial m1, each of the elements of the polynomial sl' (=s'−m1) becomes smaller, by which the amount of transmission data can be reduced more than the case where the polynomial s' is directly transmitted.

Thus, the first and second embodiments of the present invention are described above. However, they are the examples of the present invention and the present invention shall not be limited to such embodiments. That is to say that the present invention can be implemented in various forms within the scope of the present invention. The case indicated below is also included in the scope of the present invention.

(1) In the first embodiment, a polynomial sa (sa=s+(α, α, ..., α)) generated as a result of adding a vector having a norm of 0 to the polynomial s may be used instead of the polynomial s. Here, a is an integer number ranging from "1" to "q−1", while (α, α, ..., α) is a vector whose elements are all α, that is, a vector having a norm of 0. In this case, the polynomials sl, sh and th so as to satisfy sa=sl+sh×q, and t=tl+th×q are regarded to represent a signature.

(2) In the second embodiment, by adding a vector having a norm of 0 to the polynomial s, the first element (coefficient of a term of degree 0) of the polynomial s' is made equal to the first element of the polynomial m1. However, any of the other elements, namely, any of the second to the N th elements may be set equal. For example, a vector having a norm of 0 is added to the polynomial s so that the third element (a coefficient of a term of second degree) of the polynomial s' equals to the third element of the polynomial m1.

(3) In the second embodiment, sl'=s'−m1 indicating a difference between s' and m1 as a part of the signature data is transmitted. However, instead of sl', sl'' and β calculated by s1"=s'−m1+(β, β, . . . , β) may be transmitted as a part of the signature data. Here, (β, β, . . . , β) is a vector whose elements are all β.

(4) To be precise, the signature generation apparatus and the signature verification apparatus according to the first and second embodiments are a computer system comprised of a microprocessor, a Read Only Memory (ROM), a Random Access Memory (RAM), a hard disk unit, a display unit, a keyboard, a mouse and the like. A computer program is stored in the RAM or the hard disk unit. With the operation of the micro processor in accordance with the computer program, the signature generation apparatus and the signature verification apparatus achieve their respective functions. The computer program here is configured by combining plural instruction codes, each code indicating a command to a computer for achieving a predetermined function.

(5) A part or all of the components composing the signature generation apparatus and the signature verification apparatus according to the first and second embodiments may be configured by one system Large Scale Integration (LSI). The system LSI is a hyper-multifunctional LSI manufactured by integrating plural components on one chip. To be concrete, the system LSI is a computer system comprised of a micro processor, a ROM and a RAM. A computer program is stored in the RAM. With the operation of the micro processor in accordance with the computer program, the system LSI achieves its functions.

(6) A part or all of the components composing the signature generation apparatus and the signature verification apparatus according to the first and second embodiments may be configured by a single module or by an Integrated Circuit (IC) card attachable to and detachable from the signature generation apparatus or the signature verification apparatus. The IC card or the module is a computer system comprised of a micro processor, a ROM, a RAM and the like. The IC card or the module may include the hyper-multifunctional LSI as described above. With the operation of the micro processor in accordance with the computer program, the IC card or the module achieves its functions. The IC card or the module may be anti-tamper.

(7) The present invention can be realized not only as a system or an apparatus in the digital signature system according to the first and second embodiments, but also as a processing method. Moreover, the present invention may be realized as a computer program that causes a computer to execute the operation of such a processing method, or as a digital signal made up of the computer program.

(8) The present invention may also be realized as a computer-readable storage medium, such as a flexible disk, a hard disk, a Compact Disk Read Only Memory (CR-ROM), a Magneto-optical disk (MO), a Digital Versatile Disk (DVD), a DVD-RAM, a Blu-ray Disc (BD) and a semiconductor memory, in which the computer program or the digital signal is stored. The present invention may be realized as the digital signal stored in such a storage medium.

(9) The present invention may be realized as something that transfers the computer program or the digital signal via an electrical communication line, a wireless or wired communication line, a network represented by the Internet, data broadcast, or the like.

(10) The present invention may also be realized as a computer system comprised of a microprocessor and a memory. In this case, the computer program is stored in the memory and the microprocessor operates according to the computer program.

(11) The present invention may be realized by another independent computer system by recording the digital signal in the storage medium and transporting the recorded signal or transporting the digital signal via the network or the like.

(12) The present invention may be realized by combining the embodiments 1 and 2 described above.

The signature generation apparatus and the signature verification apparatus according to the present invention produce an effect of surely preventing the occurrence of inappropriate signature verification error, and is suitable for a digital signature system, for instance.

The invention claimed is:

1. A signature generation apparatus that generates signature data for message data according to a signature scheme, wherein the signature scheme includes:
   a key generation step of
      generating elements f and g of a ring R, and generating an element Fq with respect to the ring R and a positive integer q, the ring R being a set of N-dimensional arrays and defining addition, subtraction, multiplication, and a norm indicating a size of an element, the element Fq being an inverse number of f(mod q), which denotes a remainder obtained when f is divided by q,
      generating, as a public key, an element h, which is congruent, modulo q, to a product derived as a result of multiplying the element g and the element Fq,
      generating elements F and G so as to satisfy f×G−g×F=q, where "x" denotes multiplication of the ring R, and
      generating, as a private key, a set {f, g, F, G}, which includes the four elements f, g, F and G;
   a signature generation step of generating the signature data for the message data using the private key, the signature data being an element of the ring R; and
   a signature verification step of verifying the signature data using the public key, and
wherein said signature generation apparatus comprises:
   a signature vector generation device operable to calculate, for the message data, a signature vector made up of elements s and t of the ring R, the signature vector being calculated using the private key; and
   a signature data generation device operable to calculate a first element and a second element of the ring R, and to generate the signature data, which includes the first element and the second element and is obtained and verified by a signature verification apparatus, the first element specifying the element s, and the second element being a quotient of the element t divided by q.

2. The signature generation apparatus according to claim 1, wherein the first element is made up of an element sh and an element sl of the ring R, the element sh being a quotient of the element s divided by q, and the element sl being a remainder of the element s divided by q.

3. The signature generation apparatus according to claim 1, further comprising a hash value generation unit operable to generate elements m1 and m2 of the ring R by applying a hash function to the message data,
   wherein said signature data generation device is operable to generate, as the first element, a difference between the element s and the element m1.

4. The signature generation apparatus according to claim 3, wherein said signature vector generation device is operable to calculate the element s, such that an ith sub-element of the element m1 and an ith sub-element of the element s indicate a same value, where i denotes one of integer numbers ranging from 1 to N.

5. The signature generation apparatus according to claim 3, wherein said signature vector generation device is operable to calculate the element s by adding or subtracting an element of the ring R, the added or subtracted element of the ring R having a norm of 0.

6. The signature generation apparatus according to claim 3, wherein said signature vector generation device is operable to calculate the element s, such that each of sub-elements included in the first element approximates 0.

7. A signature verification apparatus that verifies signature data for message data according to a signature scheme,
wherein the signature scheme includes:
a key generation step of
generating elements f and g of a ring R, and generating an element Fq with respect to the ring R and a positive integer q, the ring R being a set of N-dimensional arrays and defining addition, subtraction, multiplication, and a norm indicating a size of an element, the element Fq being an inverse number of f(mod q), which denotes a remainder obtained when f is divided by q,
generating, as a public key, an element h, which is congruent, modulo q, to a product derived as a result of multiplying the element g and the element Fq,
generating elements F and G so as to satisfy f×G−g×F=q, where "x" denotes multiplication of the ring R, and generating, as a private key, a set {f, g, F, G}, which includes the four elements f, g, F and G;
a signature generation step of generating the signature data for the message data using the private key, the signature data being an element of the ring R; and
a signature verification step of verifying the signature data using the public key, and
wherein said signature verification apparatus comprises:
a signature data obtaining device operable to obtain the signature data that includes a first element and a second element of the ring R;
a signature vector generation device operable to
decrypt an element s of a signature vector made up of elements s and t of the ring R, the element s being decrypted using the first element of the ring R, and
decrypt the element t of the signature vector using a result of multiplying the second element of the ring R and q, the first and second elements being indicated by the signature data, and the signature vector being calculated for the message data using the private key; and
a verification device operable to verify the signature vector.

8. The signature verification apparatus according to claim 7,
wherein the first element is made up of an element sh and an element sl of the ring R, the element sh being a quotient of the element s divided by q, and the element sl being a remainder of the element t divided by q, and
wherein said signature vector generation device is operable to
decrypt the element s by multiplying the element sh with q and adding the element sl to a result of the multiplication of the element sh and the element q, and
decrypt the element t by adding a product of the second element and q to a remainder, modulo q, of a product of the element sl and the element h.

9. The signature verification apparatus according to claim 7, further comprising a hash value generation unit operable to generate elements m1 and m2 of the ring R by applying a hash function to the message data,
wherein the first element includes an element s1 of the ring R, the element s1 being a difference between the element s and the element m1, and the second element is a quotient of the element t divided by q, and
wherein said signature vector generation device is operable to
decrypt the element s by adding the element m1 to the element s1, and
decrypt the element t by adding a product of the second element and q to a remainder, modulo q, of a product of the element s and the element h.

10. The signature verification apparatus according to claim 7, further comprising a hash value generation unit operable to generate elements m1 and m2 of the ring R by applying a hash function to the message data,
wherein said verification device is operable to verify the signature vector by comparing a predetermined distance with a distance between the signature vector and a hash value vector made up of the elements m1 and m2.

11. A signature generation method of generating signature data for message data according to a signature scheme,
wherein the signature scheme includes:
a key generation step of
generating elements f and g of a ring R, and generating an element Fq with respect to the ring R and a positive integer q, the ring R being a set of N-dimensional arrays and defining addition, subtraction, multiplication, and a norm indicating a size of an element, the element Fq being an inverse number of f(mod q), which denotes a remainder obtained when f is divided by q,
generating, as a public key, an element k which is congruent, modulo q, to a product derived as a result of multiplying the element g and the element Fq,
generating elements F and G so as to satisfy f×G·g×F=q, where "x" denotes multiplication of the ring R, and
generating, as a private key, a set {f, g, F, G}, which includes the four elements f, g, F and G;
a signature generation step of generating the signature data for the message data using the private key, the signature data being an element of the ring R; and
a signature verification step of verifying the signature data using the public key, and
wherein said signature generation method comprises the signature generation step further including:
a signature vector generation step of calculating, for the message data, a signature vector made up of elements s and t of the ring R, the signature vector being calculated using the private key; and
a signature data generation step of calculating a first element and a second element of the ring R, and generating the signature data, which includes the first element and the second element and is obtained and verified by a signature verification apparatus, the first element specifying the element s, and the second element being a quotient of the element t divided by q.

12. A signature verification method of verifying signature data for message data according to a signature scheme,
wherein the signature scheme includes:
a key generation step of
generating elements f and g of a ring R, and generating an element Fq with respect to the ring R and a positive integer q, the ring R being a set of N-dimensional arrays and defining addition, subtraction, multiplication, and a norm indicating a size of an element, the element Fq being an inverse number of f(mod q), which denotes a remainder obtained when f is divided by q,
generating, as a public key, an element h, which is congruent, modulo q, to a product derived as a result of multiplying the element g and the element Fq,
generating elements F and G so as to satisfy f×G−g×F=q, where "x" denotes multiplication of the ring R, and
generating, as a private key, a set {f, g, F, G}, which includes the four elements f, g, F and G;
a signature generation step of generating the signature data for the message data using the private key, the signature data being an element of the ring R; and
a signature verification step of verifying the signature data using the public key, and
wherein said signature verification method comprises the signature verification step further including:
a signature data obtaining step of obtaining, via a signature verification apparatus, the signature data that includes a first element and a second element of the ring R;
a signature vector generation step of decrypting an element s of a signature vector made up of elements s and t of the ring R, the element s being decrypted using the first element of the ring R, and decrypting the element t of the signature vector using a result of multiplying the second element of the ring R with q, the first and second elements being indicated by the signature data, and the signature vector being calculated for the message data using the private key; and
a verification step of verifying the signature vector.

13. A non-transitory computer-readable recording medium having a program recorded thereon, the program for generating signature data for message data according to a signature scheme,
wherein the signature scheme includes:
a key generation step of
generating elements f and g of a ring R, and generating an element Fq with respect to the ring R and a positive integer q, the ring R being a set of N-dimensional arrays and defining addition, subtraction, multiplication, and a norm indicating a size of an element, the element Fq being an inverse number of f(mod q), which denotes a remainder obtained when f is divided by q,
generating, as a public key, an element h, which is congruent, modulo q, to a product derived as a result of multiplying the element g and the element Fq,
generating elements F and G so as to satisfy f×G−g×F=q, where "x" denotes multiplication of the ring R, and
generating, as a private key, a set {f, g, F, G}, which includes the four elements f, g, F and G;
a signature generation step of generating the signature data for the message data using the private key, the signature data being an element of the ring R; and
a signature verification step of verifying the signature data using the public key, and
wherein the program causes a computer to execute the signature generation step further including:
a signature vector generation step of calculating, for the message data, a signature vector made up of elements s and t of the ring R, the signature vector being calculated using the private key; and
a signature data generation step of calculating a first element and a second element of the ring R, and generating the signature data, which includes the first element and the second element and is obtained and verified by a signature verification apparatus, the first element specifying the element s, and the second element being a quotient of the element t divided by q.

14. A non-transitory computer-readable recording medium having a program recorded thereon, the program for verifying signature data for message data according to a signature scheme,
wherein the signature scheme includes:
a key generation step of
generating elements f and g of a ring R, and generating an element Fq with respect to the ring R and a positive integer q, the ring R being a set of N-dimensional arrays and defining addition, subtraction, multiplication, and a norm indicating a size of an element, the element Fq being an inverse number of f(mod q), which denotes a remainder obtained when f is divided by q,
generating, as a public key, an element h, which is congruent, modulo q, to a product derived as a result of multiplying the element g and the element Fq,
generating elements F and G so as to satisfy f×G−g×F=q, where "x" denotes multiplication of the ring R, and
generating, as a private key, a set {f, g, F, G}, which includes the four elements f, g, F and G;
a signature generation step of generating the signature data for the message data using the private key, the signature data being an element of the ring R; and
a signature verification step of verifying the signature data using the public key, and
wherein the program causes a computer to execute the signature verification step further including:
a signature data obtaining step of obtaining the signature data that includes a first element and a second element of the ring R;
a signature vector generation step of decrypting an element s of a signature vector made up of elements s and t of the ring R, the element s being decrypted using the first element of the ring R, and decrypting the element t of the signature vector using a result of multiplying the second element of the ring R with q, the first and second elements being indicated by the signature data, and the signature vector being calculated for the message data using the private key; and
a verification step of verifying the signature vector.

15. An integrated circuit for generating signature data for message data according to a signature scheme,
wherein the signature scheme includes:
a key generation step of
generating elements f and g of a ring R, and generating an element Fq with respect to the ring R and a positive integer q, the ring R being a set of N-dimensional arrays and defining addition, subtraction, multiplication, and a norm indicating a size of an element, the element Fq being an inverse number of f(mod q), which denotes a remainder obtained when f is divided by q, generating, as a public key, an element h, which is congruent, modulo q, to a product derived as a result of multiplying the element g and the element Fq, generating elements F and G so as to satisfy f×G−g×F=q, where "x" denotes multiplication of the ring R, and generating, as a private key, a set {f, g, F, G}, which includes the four elements f, g, F and G;

a signature generation step of generating the signature data for the message data using the private key, the signature data being an element of the ring R; and a signature verification step of verifying the signature data using the public key, and wherein said integrated circuit comprises:

a signature vector generation device operable to calculate, for the message data, a signature vector made up of elements s and t of the ring R, the signature vector being calculated using the private key; and a signature data generation device operable to calculate a first element and a second element of the ring R, and to generate the signature data, which includes the first element and the second element and is obtained and verified by a signature verification apparatus, the first element specifying the element s, and the second element being a quotient of the element t divided by q.

16. An integrated circuit for verifying signature data for message data according to a signature scheme, wherein the signature scheme includes:

a key generation step of generating elements f and g of a ring R, and generating an element Fq with respect to the ring R and a positive integer q, the ring R being a set of N-dimensional arrays and defining addition, subtraction, multiplication, and a norm indicating a size of an element, the element Fq being an inverse number of f(mod q), which denotes a remainder obtained when f is divided by q, generating, as a public key, an element h, which is congruent, modulo q, to a product which is derived as a result of multiplying the element g and the element Fq, generating elements F and G so as to satisfy f×G−g×F=q, where "x" denotes multiplication of the ring R, and generating, as a private key, a set {f, g, F, G}, which includes the four elements f, g, F and G;

a signature generation step of generating the signature data for the message data using the private key, the signature data being an element of the ring R; and a signature verification step of verifying the signature data using the public key, and wherein said integrated circuit comprises:

a signature data obtaining device operable to obtain the signature data that includes a first element and a second element of the ring R;

a signature vector generation device operable to decrypt an element s of a signature vector made up of elements s and t of the ring R, the element s being decrypted using the first element of the ring R, and decrypt the element t of the signature vector using a result of multiplying the second element of the ring R and q, the first and second elements being indicated by the signature data, and the signature vector being calculated for the message data using the private key; and a verification device operable to verify the signature vector.

* * * * *

UNITED STATES PATENT AND TRADEMARK OFFICE
CERTIFICATE OF CORRECTION

| | |
|---|---|
| PATENT NO. | : 7,792,286 B2 |
| APPLICATION NO. | : 11/578978 |
| DATED | : September 7, 2010 |
| INVENTOR(S) | : Yuichi Futa et al. |

It is certified that error appears in the above-identified patent and that said Letters Patent is hereby corrected as shown below:

IN THE CLAIMS

In column 30, claim 11, line 40, "element k" should read -- element h --.

In column 30, claim 11, line 44, "f×G·g×F=q" should read -- f×G-g×F=q --.

Signed and Sealed this
First Day of February, 2011

David J. Kappos
*Director of the United States Patent and Trademark Office*